United States Patent
Matsumoto et al.

(10) Patent No.: US 8,283,000 B2
(45) Date of Patent: Oct. 9, 2012

(54) LIQUID CRYSTAL COMPOSITION CONTAINING POLYMERIZABLE COMPOUND AND LIQUID CRYSTAL DISPLAY USING THE LIQUID CRYSTAL COMPOSITION

(75) Inventors: Ken Matsumoto, Tokyo (JP); Masatomi Irisawa, Tokyo (JP)

(73) Assignee: Adeka Corporation, Tokyo (JP)

( * ) Notice: Subject to any disclaimer, the term of this patent is extended or adjusted under 35 U.S.C. 154(b) by 112 days.

(21) Appl. No.: 12/865,022

(22) PCT Filed: Feb. 2, 2009

(86) PCT No.: PCT/JP2009/051723
§ 371 (c)(1),
(2), (4) Date: Jul. 28, 2010

(87) PCT Pub. No.: WO2009/104468
PCT Pub. Date: Aug. 27, 2009

(65) Prior Publication Data
US 2010/0328601 A1    Dec. 30, 2010

(30) Foreign Application Priority Data
Feb. 22, 2008   (JP) .................. 2008-041221

(51) Int. Cl.
C09K 19/30 (2006.01)
C09K 19/20 (2006.01)
C09K 19/12 (2006.01)
C09K 19/32 (2006.01)
C09K 19/52 (2006.01)

(52) U.S. Cl. ............... 428/1.1; 252/299.01; 252/299.62; 252/266.63; 252/299.64; 252/299.65; 252/299.66; 252/299.67

(58) Field of Classification Search .............. 428/1.1; 252/299.01, 299.64, 299.65, 299.66, 299.67, 252/299.62, 299.63
See application file for complete search history.

(56) References Cited

U.S. PATENT DOCUMENTS

| | | | |
|---|---|---|---|
| 5,262,882 A | 11/1993 | Hikmet | |
| 5,723,066 A | 3/1998 | Coates et al. | |
| 5,746,938 A | 5/1998 | Coates et al. | |
| 6,146,718 A | 11/2000 | Yano et al. | |
| 6,187,222 B1 | 2/2001 | Coates et al. | |
| 7,169,449 B2 | 1/2007 | Nakanishi et al. | |
| 2006/0278849 A1* | 12/2006 | Suzuki et al. | 252/299.61 |
| 2009/0137761 A1 | 5/2009 | Irisawa et al. | |
| 2010/0032621 A1 | 2/2010 | Itano et al. | |
| 2010/0090163 A1 | 4/2010 | Irisawa et al. | |

FOREIGN PATENT DOCUMENTS

| | | |
|---|---|---|
| JP | 5-080341 | 4/1993 |
| JP | 11-116534 | 4/1999 |
| JP | 11-349582 | 12/1999 |
| JP | 2001-114722 | 4/2001 |
| JP | 2001-019965 | 1/2003 |
| JP | 2003-307720 A | 10/2003 |
| JP | 2004-244421 | 9/2004 |
| JP | 2005-048007 A | 2/2005 |
| JP | 2006-215184 A | 8/2006 |
| JP | 2007-023071 A | 2/2007 |
| JP | 2007-119415 | 5/2007 |
| JP | 2008-195762 | 8/2008 |
| JP | 2008-239913 | 10/2008 |
| JP | 2009-029929 | 2/2009 |
| WO | WO 2006/049111 | 5/2006 |
| WO | WO 2008/081631 | 7/2008 |

OTHER PUBLICATIONS

International Search Report, PCT/JP2009/051723, Feb. 24, 2009.
EKISHO, vol. 3, No. 2, p. 117-123 (1999).
EKISHO, vol. 3, No. 4, p. 272-278 (1999).

* cited by examiner

Primary Examiner — Shean Wu
(74) Attorney, Agent, or Firm — Young & Thompson

(57) ABSTRACT

A liquid crystal composition includes 100 parts by mass of a nematic liquid crystal composition having negative dielectric anisotropy and 0.01 to 3 parts by mass of a polymerizable compound of general formula (I). On being irradiated with an energy ray, such as UV rays, the liquid crystal composition provides an LCD capable of high-speed response without undergoing reduction in reliability (voltage holding ratio).

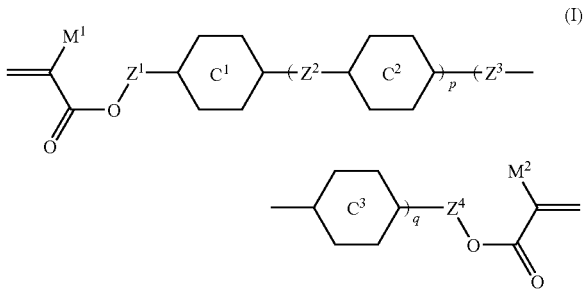

In formula (I), rings $C^{1-3}$ are benzene, cyclohexane or naphthalene; $M^{1-2}$ are hydrogen or methyl; $Z^1$ is a direct bond, $-L^1-$, $-L^1O-$, etc.; $Z^4$ is a direct bond, $-L^2-$, $-OL^2-$, etc.; at least one of $Z^1$ and $Z^4$ is not a direct bond; $L^{1,2}$ are C1-C10 alkylene; when $Z^1=Z^4$, one or more hydrogen atoms of the rings $C^1$, $C^2$, and $C^3$ are substituted; $Z^2$ and $Z^3$ are each a direct bond, an ester bond, etc.; p and q are each 0 or 1, provided that $p+q \geq 1$.

17 Claims, 2 Drawing Sheets

Fig. 1(a) Example 2-1
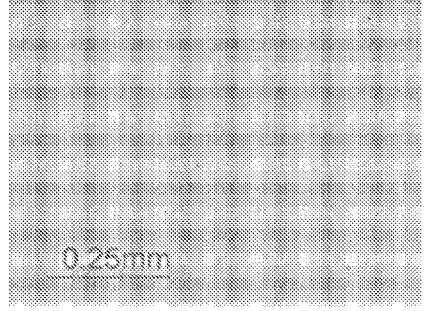
Fig. 1(b) Example 2-2
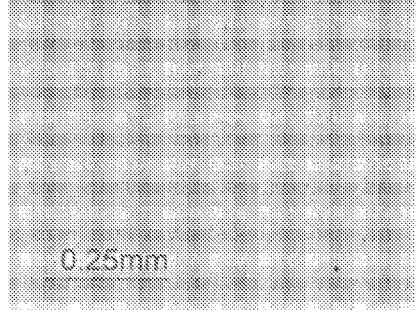
Fig. 1(c) Example 2-3
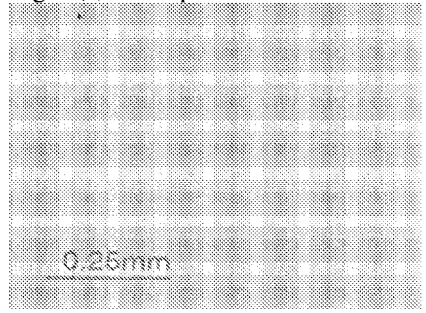
Fig. 1(d) Example 2-8
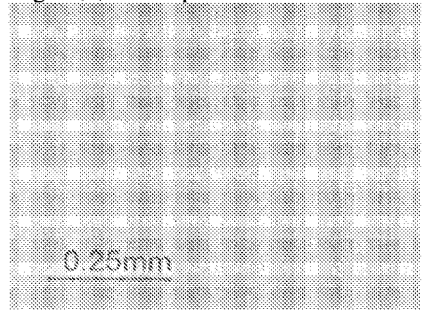
Fig. 1(e) Example 2-9
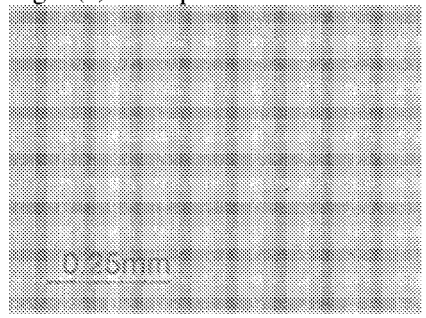
Fig. 1(f) Example 2-10
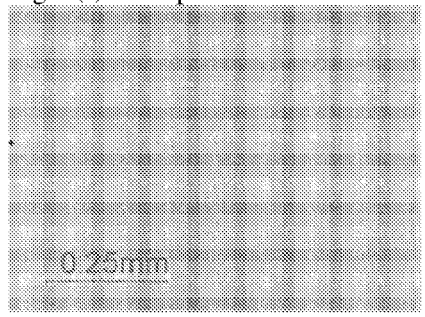
Fig. 1(g) Example 2-11
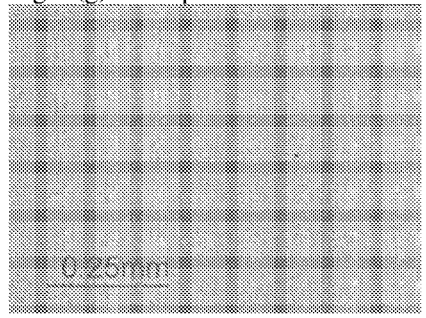
Fig. 1(h) Example 2-12
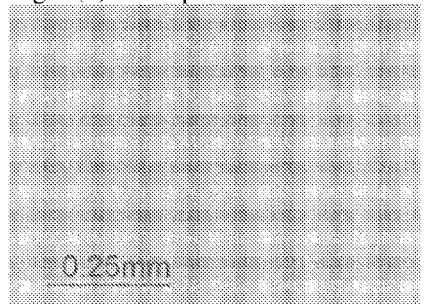

Fig. 2(a) Comparative Example 1-1
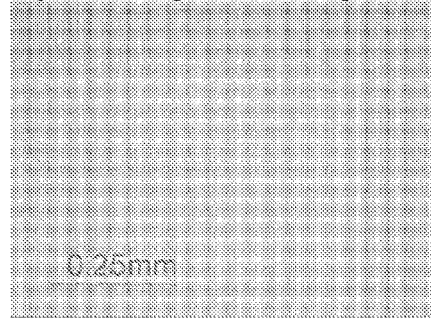
Fig. 2(b) Comparative Example 2-1
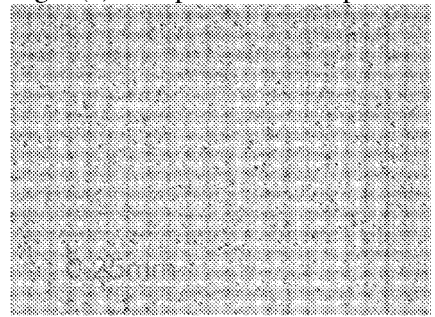
Fig. 2(c) Comparative Example 2-2
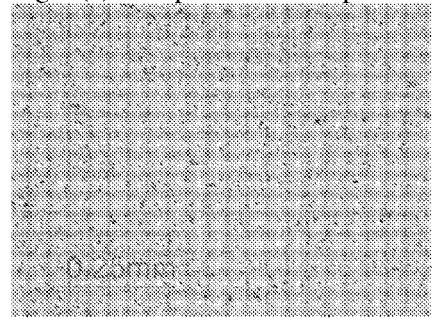
Fig. 2(d) Comparative Example 2-3
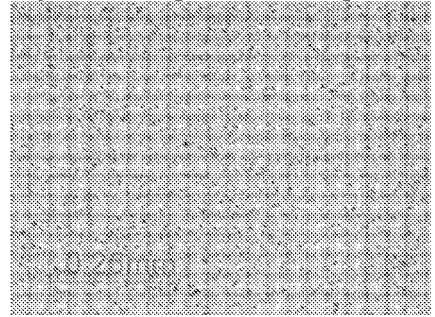
Fig. 2(e) Comparative Example 2-6
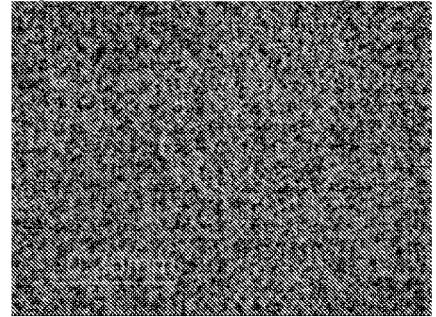

LIQUID CRYSTAL COMPOSITION CONTAINING POLYMERIZABLE COMPOUND AND LIQUID CRYSTAL DISPLAY USING THE LIQUID CRYSTAL COMPOSITION

FIELD OF THE INVENTION

This invention relates to a liquid crystal composition having a specific liquid crystal composition and a polymerizable liquid crystal compound having a (meth)acryloyl group as a polymerizable group and an electrooptical display device having the liquid crystal composition sandwiched between substrates.

BACKGROUND OF THE INVENTION

A large number of liquid crystal displays (LCDs) utilizing optical (refractive index) anisotropy ($\Delta n$) (hereinafter sometimes simply referred to as $\Delta n$) and dielectric anisotropy ($\Delta \in$) (hereinafter sometimes simply referred to as $\Delta \in$) characteristic of liquid crystal compounds have been produced. LCDs are widely applied to watches, calculators, various measuring instruments, automotive panels, word processors, electronic notebooks, cell phones, printers, computers, TV sets, etc. and in ever increasing demand A liquid crystal compound exhibits an inherent liquid crystal phase between a solid phase and a liquid phase. Liquid crystal phases are roughly classified into a nematic phase, a smectic phase, and a cholesteric phase. For display applications, a nematic phase is most widely used. Display modes applied to LCDs typically include twist nematic (TN), super twist nematic (STN), dynamic scatter (DS), guest host (GH), in-plane switching (IPS), optically compensated birefringence (OCB), electrically controlled birefringence (ECB), vertical alignment (VA), color super homeotropic (CSH), and ferroelectric liquid crystal (FLC). As drive systems, a multiplex drive system has now become common, replacing a traditional static drive system. Passive matrix LCDs and, more lately, active matrix (AM) LCDs driven by thin film transistors (TFTs) or MIMs are prevailing.

Conventional AM-LCDs mostly use a TN mode liquid crystal cell in which molecules of a liquid crystal material having a positive dielectric anisotropy ($\Delta \in$) are aligned to be in parallel to the substrates and twisted by 90 degrees between the opposing substrates. However, the TN mode LCDs have a disadvantage of a narrow viewing angle, and various studies have been made to increase the viewing angle.

VA mode LCDs, particularly MVA and EVA mode LCDs described in non-patent documents 1 and 2 (see below) have been developed as an alternative to TN mode LCDs and succeeded in greatly improving viewing angle characteristics. In these VA mode LCDs, molecules of a liquid crystal material having negative dielectric anisotropy between two substrate are aligned perpendicular to the substrates and, with a voltage applied, the tilt direction of the liquid crystal directors are controlled by ribs or slits made on the surface of the substrates. Recently, an LCD made by using a liquid crystal material containing a monomer or an oligomer polymerizable on light or heat application has been proposed as in patent document 1 (see below). An LCD of this type is produced by sealing the liquid crystal material in between two substrates and polymerizing the polymerizable component while adjusting the voltage applied to the liquid crystal layer thereby to decide the alignment direction of the liquid crystal molecules.

Thus studies to improve the viewing angle characteristics are well underway, providing practical big LCD panels for notebook or desktop computers and even bigger display media represented by LCD-TV monitors. However, there is a problem with these LCDs that they are slow in response to an electric field, and demands for rapid response are still high. LCDs used to display moving images, such as LCD-TVs, are particularly required to exhibit a rapid response. In order to achieve high definition and high display qualities with an LCD, it is necessary to develop and use a liquid crystal material having rapid response characteristics.

In order to obtain a good contrast ratio with an LCD driven at a constant frame rate, it is desirable for the LCD to have a high voltage holding ratio (voltage holding ratio during a frame period, hereinafter abbreviated as VHR). In the case where a liquid crystal material is given energy, such as light or heat, as in patent document 1, the compound can deteriorate to cause reduction in VHR.

Patent document 1 discloses a VA mode LCD with reduced burn-in and a composition used therefor. Patent document 2 below discloses an alignment film providing a VA mode LCD having a high VHR. With these techniques, nevertheless, a satisfactory response speed is not obtained. Patent documents 3 and 4 below disclose a VA mode liquid crystal composition but have no mention of the use of a polymerizable liquid crystal compound having a (meth)acryloyl group as a polymerizable group. Patent document 5 below proposes a polymerizable liquid crystal compound but neither describes nor suggests the use of the compound in a liquid crystal composition having negative dielectric anisotropy ($\Delta \in$).

Patent document 1: JP 2003-307720A
Patent document 2: JP 2006-215184A
Patent document 3: JP 2005-48007A
Patent document 4: JP 2007-23071A
Patent document 5: JP 2007-119415A
Non-patent document 1: EKISHO, vol. 3, No. 2, p. 117 (1999)
Non-patent document 2: EKISHO, vol. 3, No. 4, p. 272 (1999)

SUMMARY OF THE INVENTION

Problem to be Solved by the Invention

An object of the invention is to provide a liquid crystal composition that does not deteriorate in reliability (VHR) on being irradiated with energy rays, such as ultraviolet rays, and affords an LCD capable of high speed response.

The above object of the invention is accomplished by the provision of a liquid crystal composition comprising 100 parts by mass of a nematic liquid crystal composition having negative dielectric anisotropy ($\Delta \in$) and 0.01 to 3 parts by mass of a polymerizable compound represented by general formula (I):

[Chemical Formula 1]

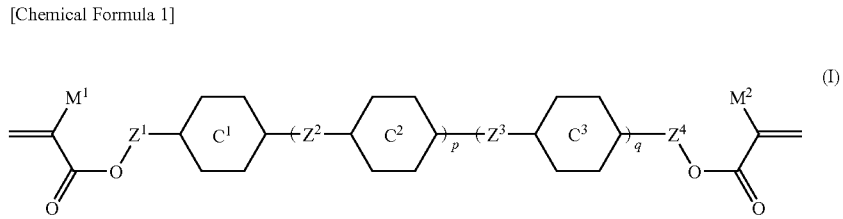

wherein ring $C^1$, ring $C^2$, and ring $C^3$ each independently represent a benzene ring, a cyclohexane ring, or a naphthalene ring, one or more hydrogen atoms of each of which are optionally substituted with an alkyl group having 1 to 3 carbon atoms, an alkoxy group having 1 to 3 carbon atoms, an acyl group having 1 to 3 carbon atoms, or a halogen atom;

$M^1$ and $M^2$ each independently represent a hydrogen atom or a methyl group;

$Z^1$ represents a direct bond, $-L^1-$, $-L^1O-$, $-L^1O-CO-$, or $-L^1CO-O-$, and $Z^4$ represents a direct bond, $-L^2-$, $-OL^2-$, $-O-COL^2-$, or $-CO-OL^2-$, provided that at least one of $Z^1$ and $Z^4$ is not a direct bond; wherein $L^1$ and $L^2$ each independently represent an optionally branched alkylene group having 1 to 10 carbon atoms, the alkylene group being optionally interrupted by one to three oxygen atoms, provided that the two or three interrupting oxygen atoms are not continuous and that the interrupting oxygen atom is not continuous to an oxygen atom adjacent to the alkylene group; when $Z^1$ and $Z^4$ are the same, one or more hydrogen atoms of the rings $C^1$, $C^2$, and $C^3$ are substituted by an alkyl group having 1 to 3 carbon atoms, an alkoxy group having 1 to 3 carbon atoms, an acyl group having 1 to 3 carbon atoms, or a halogen atom;

$Z^2$ and $Z^3$ each independently represent a direct bond, an ester bond, an ether bond, or an optionally branched, saturated or unsaturated alkylene group having 2 to 8 carbon atoms, or a combination thereof; and p and q each independently represent 0 or 1, provided that $p+q \geq 1$.

The invention also provides an electrooptical display device fabricated by sandwiching the liquid crystal composition of the invention between two substrates at least one of which has an electrode to apply a voltage to liquid crystal molecules, irradiating the liquid crystal composition with an energy ray to cause the polymerizable compound represented by general formula (I) present in the liquid crystal composition to polymerize.

BRIEF DESCRIPTION OF THE DRAWING

FIG. 1(a), FIG. 1(b), FIG. 1(c), FIG. 1(d), FIG. 1(e), FIG. 1(f), FIG. 1(g), and FIG. 1(h) each present a polarizing micrograph of a liquid crystal composition of the invention observed in Evaluation Example 1, of which FIG. 1(a) is a polarizing micrograph of the liquid crystal composition of Example 2-1; FIG. 1(b), of Example 2-2; FIG. 1(c), of Example 2-3; FIG. 1(d), of Example 2-8; FIG. 1(e), of Example 2-9; FIG. 1(f), of Example 2-10; FIG. 1(g), of Example 2-11; and FIG. 1(h), of Example 2-12.

FIG. 2(a), FIG. 2(b), FIG. 2(c), FIG. 2(d), and FIG. 2(e) each present a polarizing micrograph of a comparative liquid crystal composition observed in Evaluation Example 1, of which FIG. 2(a) is a polarizing micrograph of the liquid crystal composition of Comparative Example 1-1; FIG. 2(b), of Comparative Example 2-1; FIG. 2(c), of Comparative Example 2-2; FIG. 2(d), of Comparative Example 2-3; and FIG. 2(e), of Comparative Example 2-6.

DETAILED DESCRIPTION OF THE INVENTION

The present invention will be described in detail based on its preferred embodiments.

The liquid crystal composition of the invention comprises 100 parts by mass of a nematic liquid crystal composition having negative dielectric anisotropy ($\Delta \in$) and 0.01 to 3 parts by mass of a polymerizable compound represented by general formula (I). The liquid crystal composition preferably contains 0.05 to 2 parts by mass of the polymerizable compound per 100 parts by mass of the nematic liquid crystal composition. If the content of the polymerizable compound is less than 0.01 parts by mass, the response is slow. If it is more than 3 parts by mass, the composition has poor solubility. More preferably, the content of the polymerizable compound is from 0.05 to 1 part by mass per 100 pats by mass of the nematic liquid crystal composition. With this content the composition achieves a particularly high VHR.

Examples of the C1-C3 alkyl group, the C1-C3 alkoxy group, and the C1-C3 acyl group that may be substituted for the hydrogen atom of the rings $C^1$, $C^2$, and $C^3$ in formula (I) include methyl, ethyl, propyl, and isopropyl; methoxy, ethoxy, propoxy, and isopropoxy; and formyl, acetyl, and propionyl, respectively. Examples of the halogen atom that may be substituted for the hydrogen atom of the rings $C^1$, $C^2$, and $C^3$ in formula (I) include fluorine, chloride, bromine, and iodine.

Examples of the optionally branched C1-C10 alkylene group represented by $L^1$ and $L^2$ in formula (I) include methylene, ethylene, propylene, trimethylene, tetramethylene, butane-1,3-diyl, 2-methylpropane-1,3-diyl, 2-methylbutane-1,3-diyl, pentane-2,4-diyl, pentane-1,4-diyl, 3-methylbutane-1,4-diyl, 2-methylpentane-1,4-diyl, pentamethylene, hexamethylene, heptamethylene, octamethylene, nonamethylene, and decamethylene.

Examples of the direct bond, the ester bond, the ether bond, the optionally branched, saturated or unsaturated C2-C8 alkylene group, or a combination thereof include $-CO-O-$, $-O-CO-$, $-O-CO-O-$, $-(CH_2)_a-$, $-(CH_2)_a-O-$, $-O-(CH_2)_a-$, $-O-(CH_2)_a-O-$, $-(CH_2)_a-O-CO-$, $-CO-O-(CH_2)_a-$, $-(CH_2)_a-CO-O-$, $-O-CO-(CH_2)_a-$, $-(CH_2)_a-O-OC-O-$, $-O-CO-O-(CH_2)_a-$, $-O-(CH_2)_a-O-CO-$, $-CO-O-(CH_2)_a-O-$, $-O-(CH_2)_a-CO-O-$, $-O-CO-(CH_2)_a-O-$, $-O-(CH_2)_a-O-OC-O-$, $-O-OC-O-(CH_2)_a-O-$, $-(CH_2CH_2O)_b-$, and $-(OCH_2CH_2)_b-$, wherein a is an integer of 2 to 8, and b is an integer of 1 to 3.

The compound of formula (I) in which at least one hydrogen atom of the rings $C^1$, $C^2$, and $C^3$ is substituted by C1-C3 alkyl, C1-C3 alkoxy, C1-C3 acyl, or halogen is preferred as having good solubility in the nematic liquid crystal compound.

As used therein, the expression "when $Z^1$ and $Z^4$ are the same" means that $Z^1$ and $Z^4$ are a combination of $-L^1-$ and $-L^2-$, a combination of $-L^1O-$ and $-OL^2-$, a combination of $-L^1O-CO-$ and $-CO-OL^2-$, or a combination of $-L^1CO-O-$ and $-O-COL^2-$.

The compound of formula (I) in which $Z^1$ and $Z^4$ are different or $L^1$ and $L^2$ are different; the compound of formula (I) in which either $Z^1$ or $Z^4$ is a direct bond; the compound of formula (I) in which $Z^2$ and $Z^3$ are each an ester bond; and the compound of formula (I) in which $L^1$ and/or $L^2$ (especially $L^1$ and $L^2$) is/are a C2-C8 alkylene group are also preferred for their good solubility in the nematic liquid crystal composition.

In preparing the liquid crystal composition of the invention, it is advisable that the polymerizable compound of formula (I) be dissolved in the nematic liquid crystal composition at room temperature because heating the system for facilitating dissolving can invite reduction in VHR. From this point of view, it is preferred for the polymerizable compound to be used to have good solubility.

The polymerizable compounds of formula (I) in which p and q are both 1; the polymerizable compounds of formula (I) in which either $M^1$ or $M^2$ is methyl; and the polymerizable compounds of formula (I) in which $M^1$ and $M^2$ are both methyl are still preferred in terms of superior reliability of the resulting liquid crystal compositions. Those in which $M^1$ and $M^2$ are both methyl are particularly preferred for their high polymerization reactivity.
Examples of the polymerizable compound of general formula (I) include, but are not limited to, the following compounds.
[Chemical Formula 2-1]
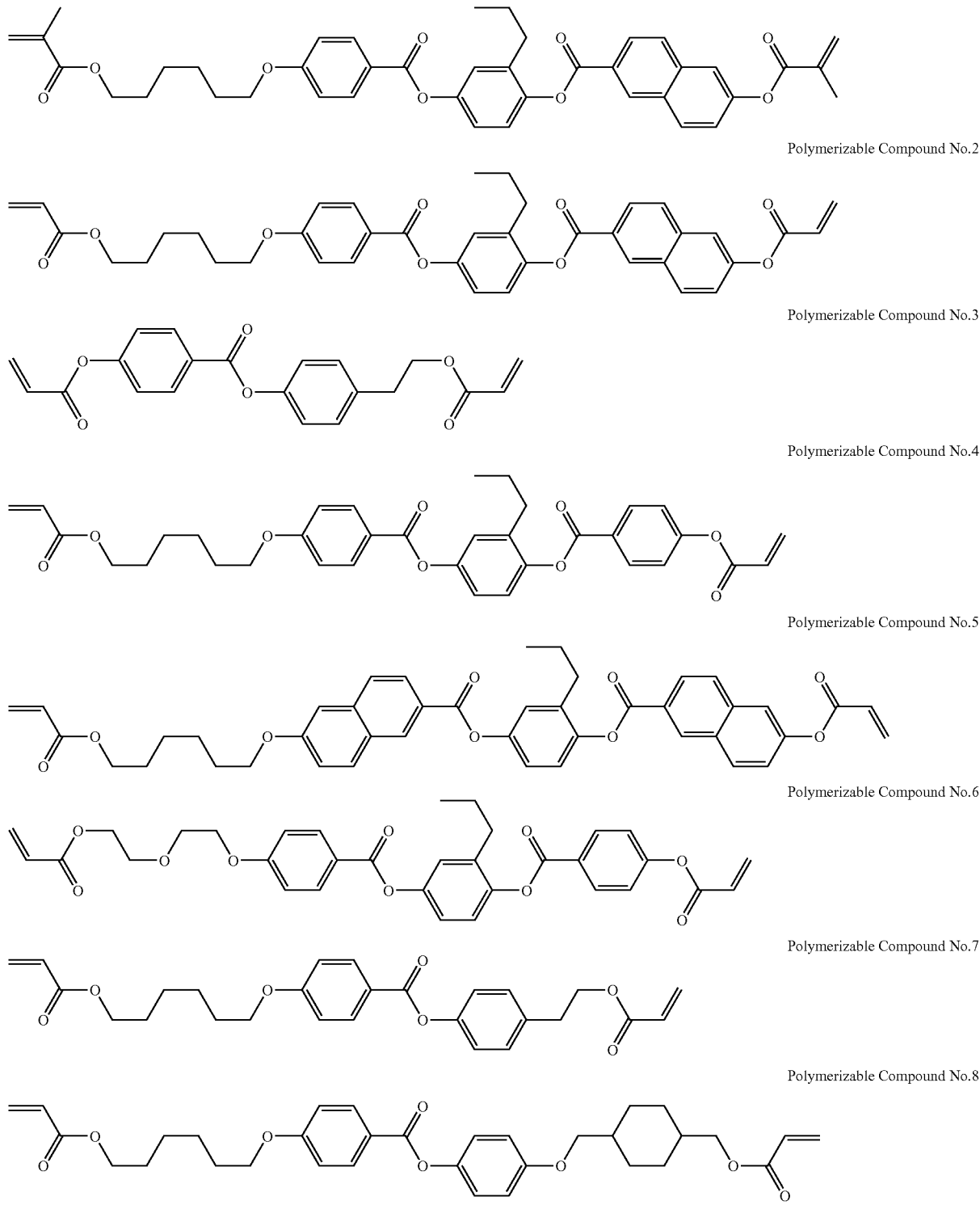

-continued
[Chemical Formula 2-2]
Polymerizable Compound No.9
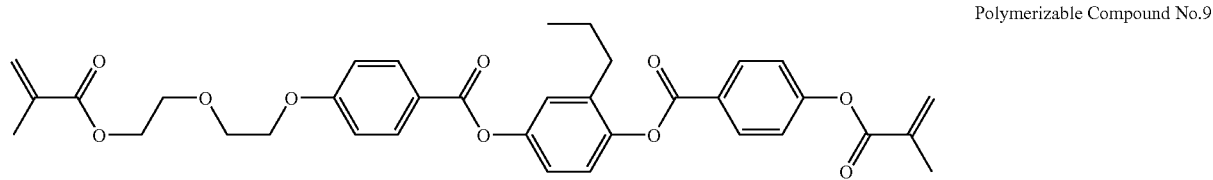
Polymerizable Compound No.10
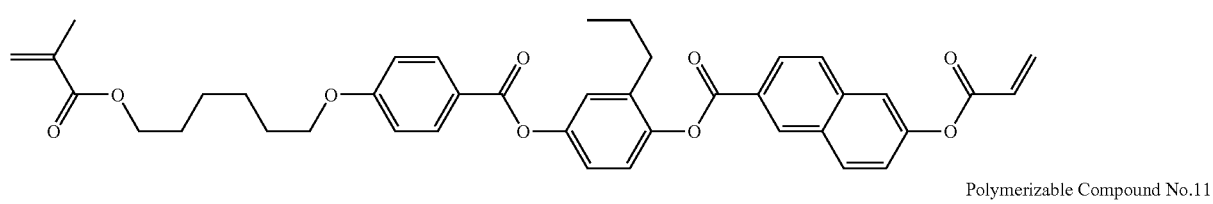
Polymerizable Compound No.11
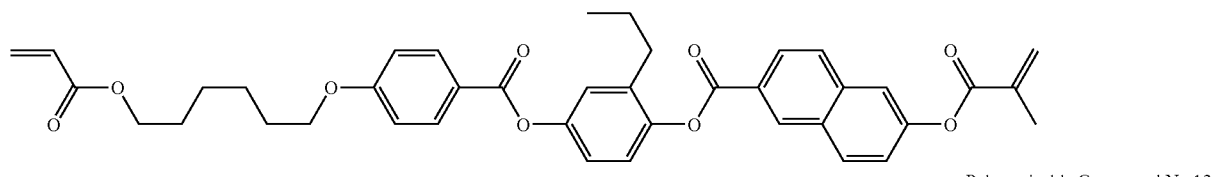
Polymerizable Compound No.12
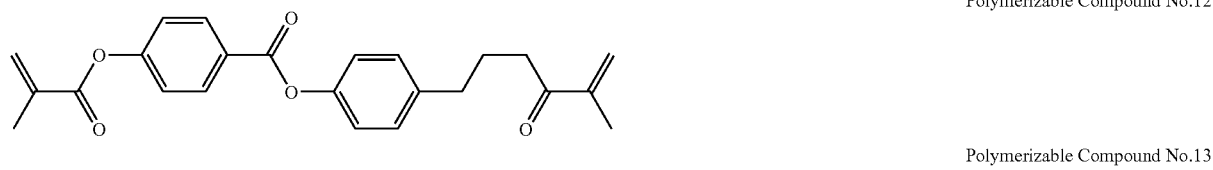
Polymerizable Compound No.13
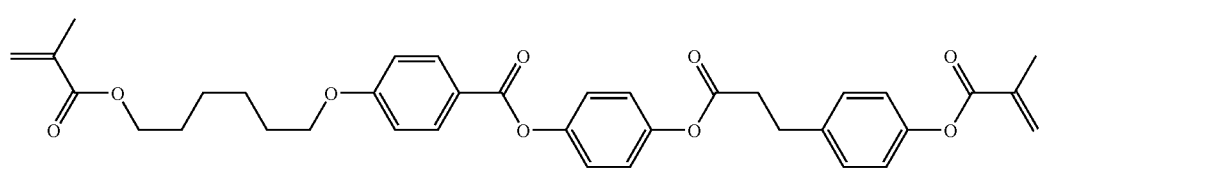
Polymerizable Compound No.14
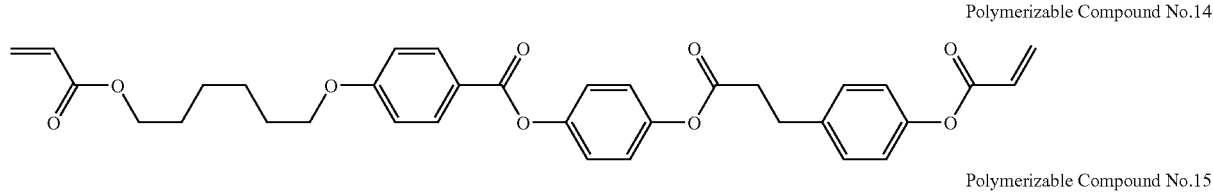
Polymerizable Compound No.15
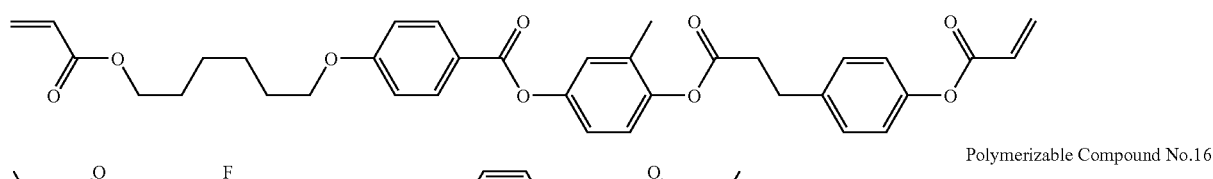
Polymerizable Compound No.16
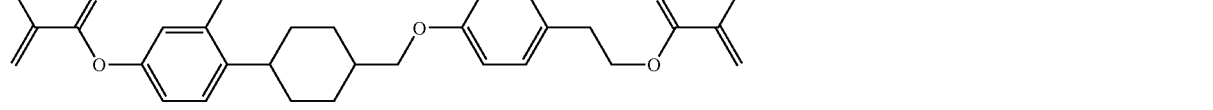
[Chemical Formula 2-3]
Polymerizable Compound No.17
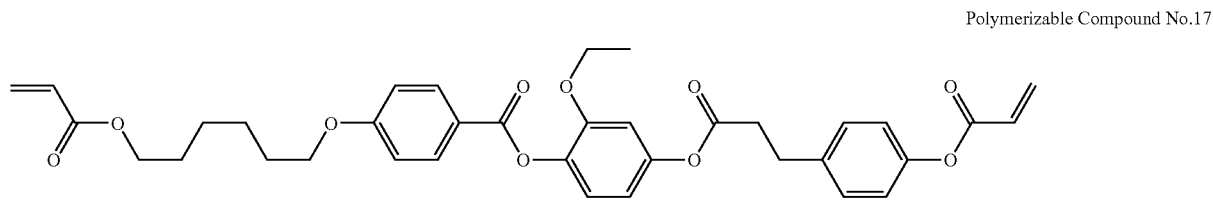

-continued
Polymerizable Compound No.18
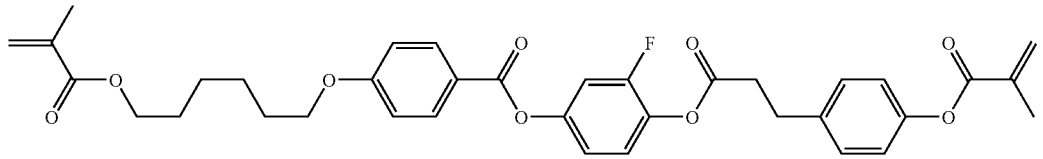
Polymerizable Compound No.19
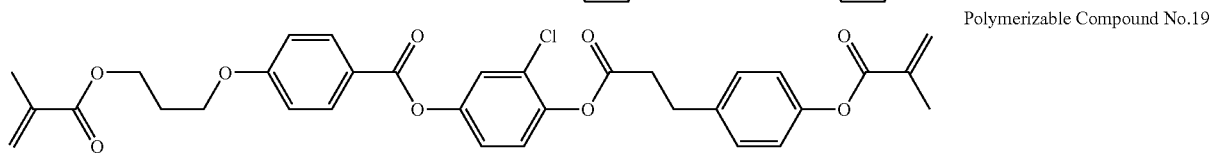
Polymerizable Compound No.20
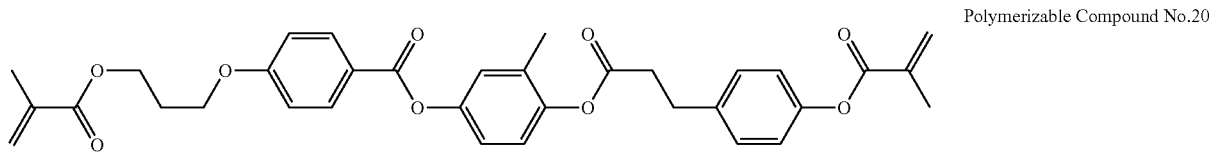
Polymerizable Compound No.21
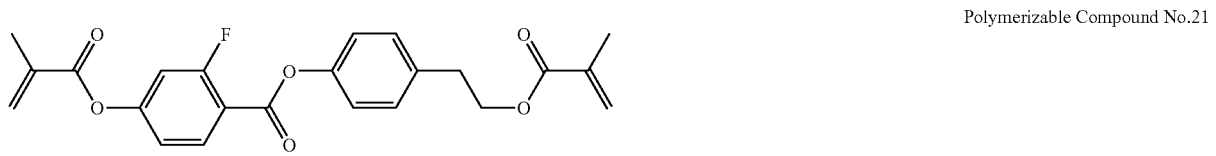
Polymerizable Compound No.22
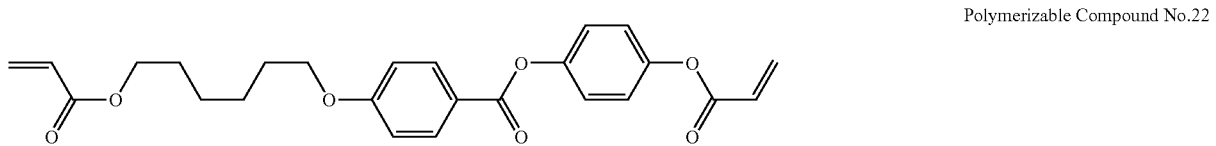
Polymerizable Compound No.23
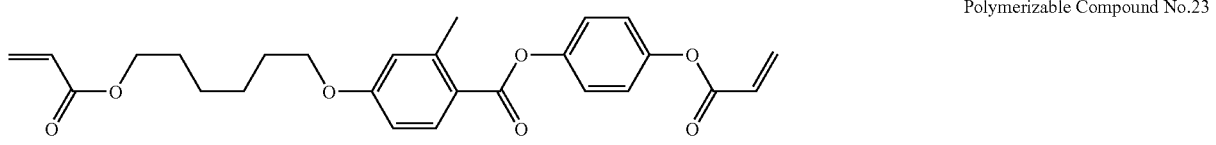
Polymerizable Compound No.24
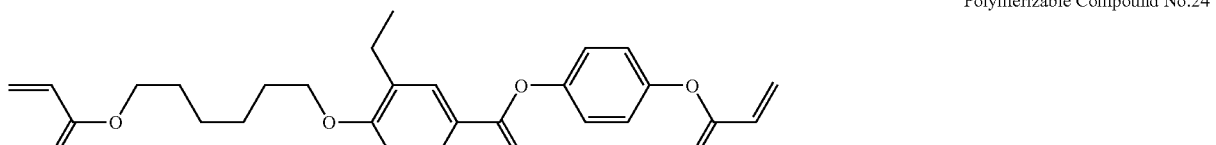
[Chemical Formula 2-4]
Polymerizable Compound No.25
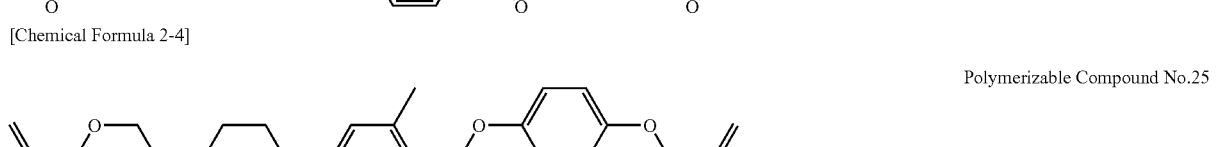
Polymerizable Compound No.26
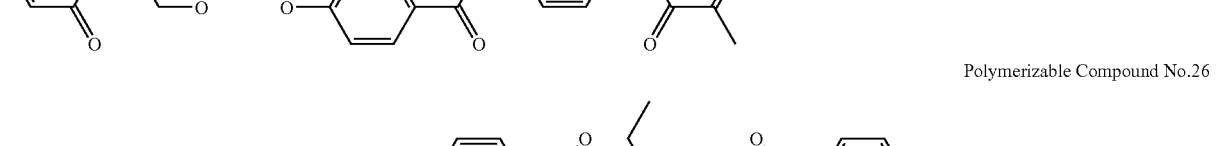
Polymerizable Compound No.27
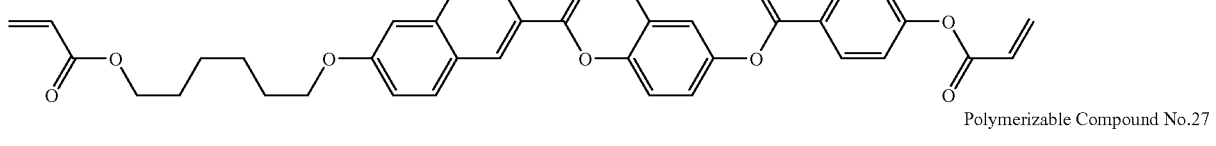
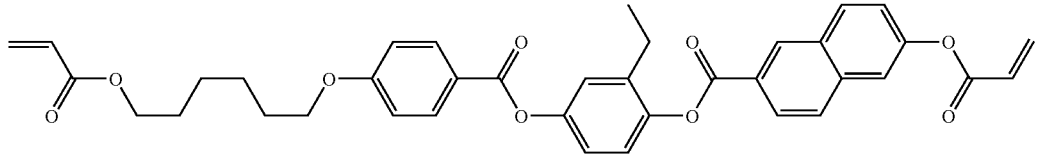

-continued
Polymerizable Compound No.28
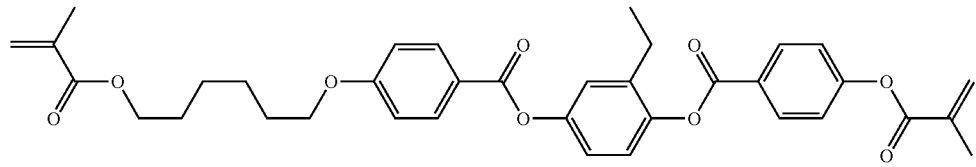
Polymerizable Compound No.29
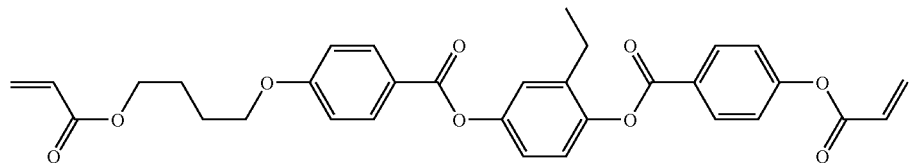
Polymerizable Compound No.30
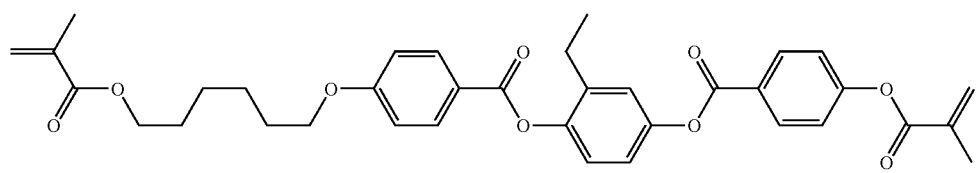
Polymerizable Compound No.31
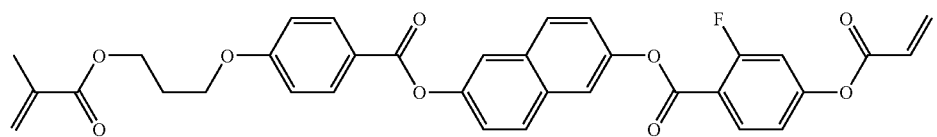
Polymerizable Compound No.32
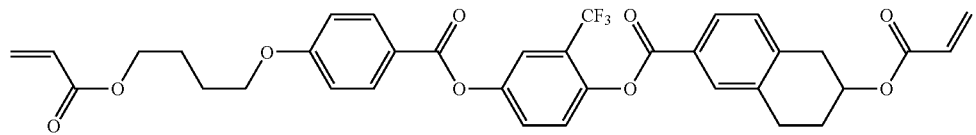
[Chemical Formula 2-5]
Polymerizable Compound No.33
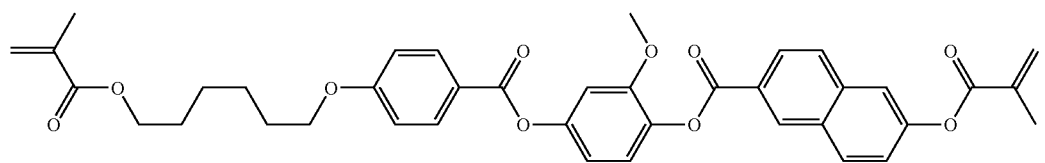
Polymerizable Compound No.34
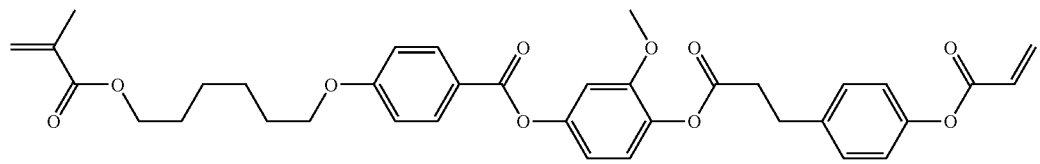
Polymerizable Compound No.35
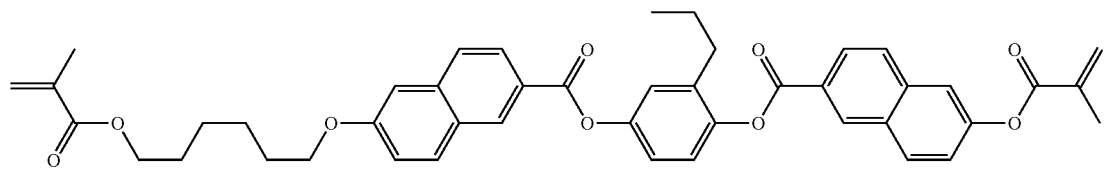

Polymerizable Compound No.36
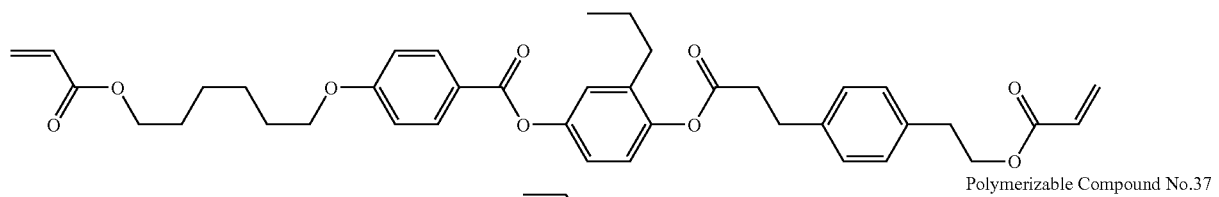
Polymerizable Compound No.37
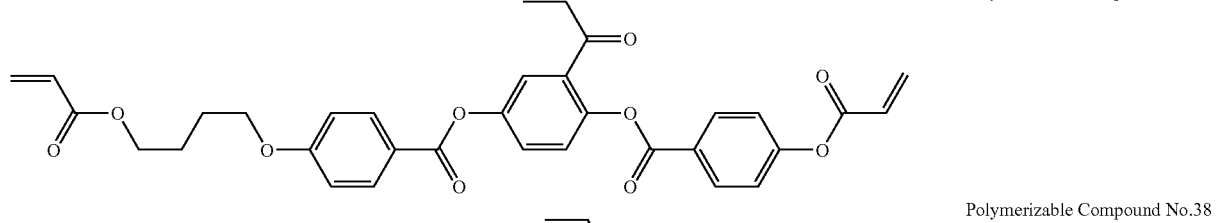
Polymerizable Compound No.38
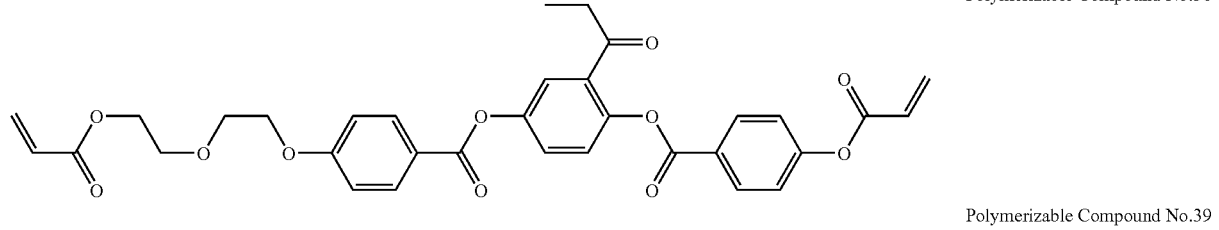
Polymerizable Compound No.39
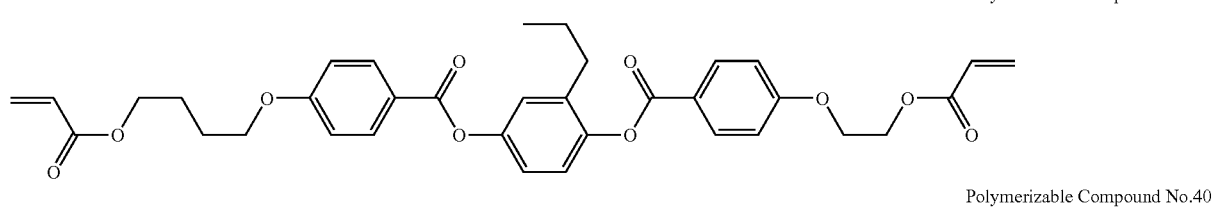
Polymerizable Compound No.40
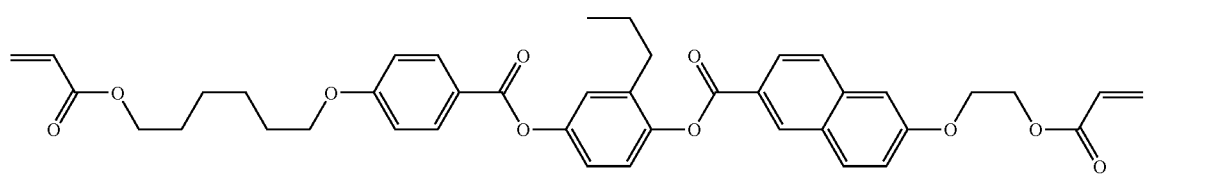
[Chemical Formula 2-6]
Polymerizable Compound No.41
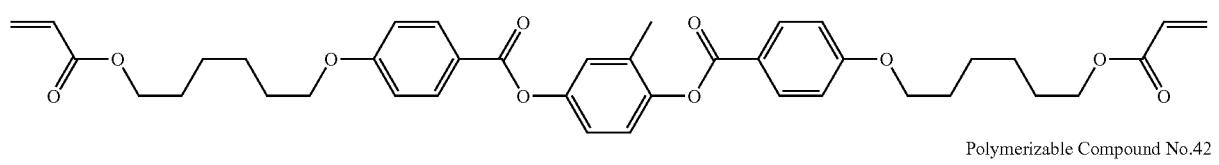
Polymerizable Compound No.42
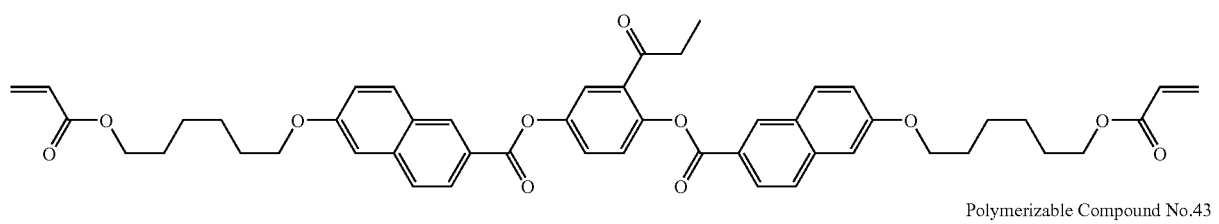
Polymerizable Compound No.43
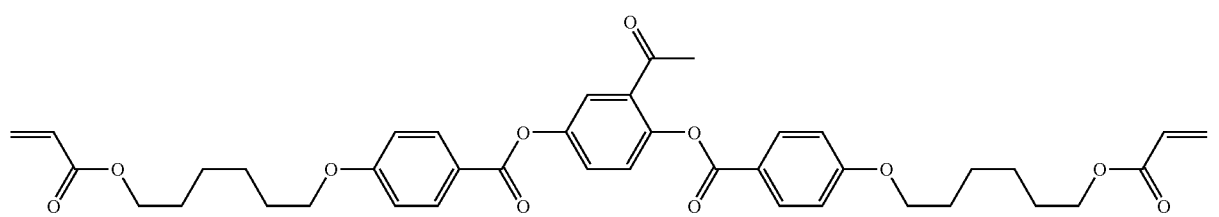

-continued

Polymerizable Compound No.44
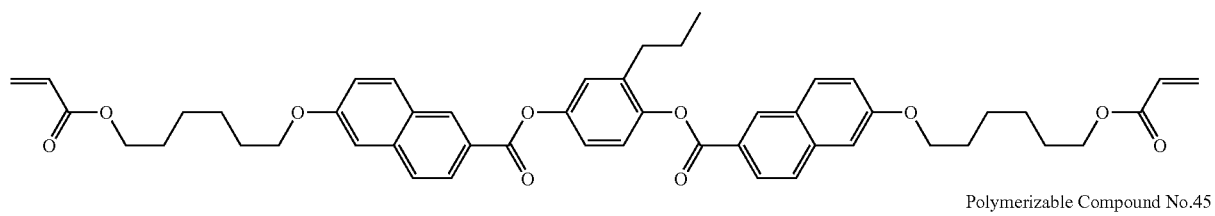

Polymerizable Compound No.45
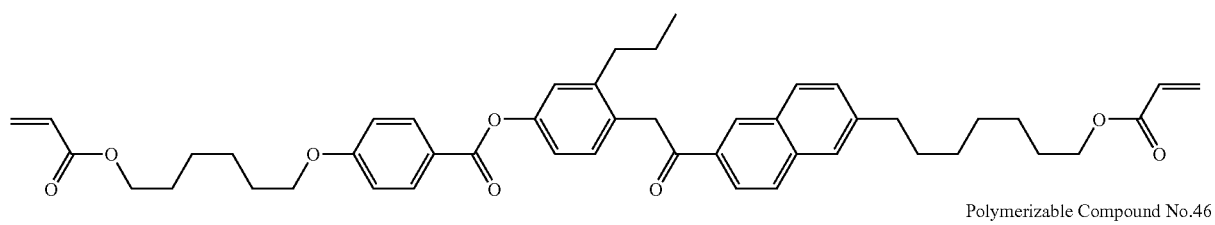

Polymerizable Compound No.46
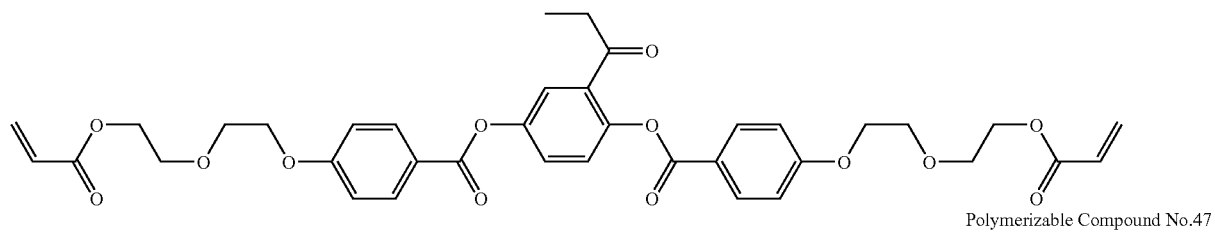

Polymerizable Compound No.47
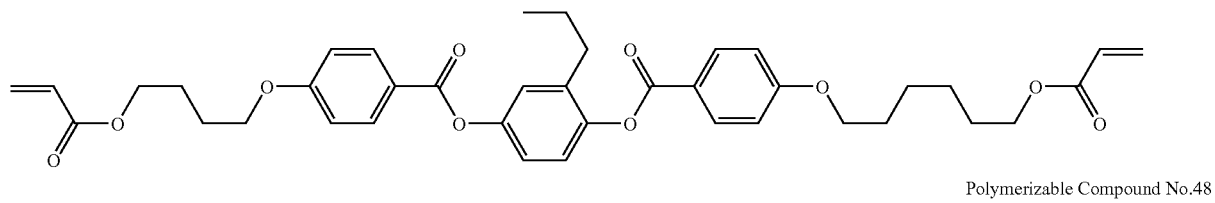

Polymerizable Compound No.48
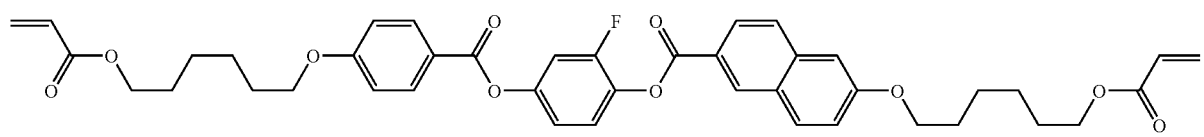

The nematic liquid crystal composition having negative dielectric anisotropy (Δ∈) that can be used in the invention may be prepared using any appropriate known liquid crystal compound so as to exhibit negative dielectric anisotropy (Δ∈). In particular, a nematic liquid crystal composition containing a liquid crystal compound represented by general formula (II) shown below in a proportion of 30 to 100% by mass is preferred for its excellent liquid crystal display characteristics. The liquid crystal compounds represented by formula (II) may be used either individually or as a combination of two or more thereof.

[Chemical Formula 3]

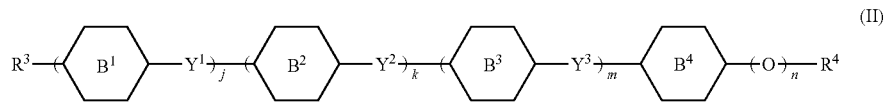
(II)

wherein ring $B^1$, ring $B^2$, ring $B^3$, and ring $B^4$ each independently represent a benzene ring, a cyclohexane ring, a cyclohexene ring, a naphthalene ring, a decahydronaphthalene ring, a tetrahydronaphthalene ring, or an indane ring, one or more hydrogen atoms of which rings are optionally substituted by an alkyl group having 1 to 3 carbon atoms, an alkoxy group having 1 to 3 carbon atoms, a chlorine atom, or a fluorine atom, a —CH= moiety of which rings is optionally substituted by —N=, and a —CH$^2$— moiety of which rings is optionally substituted by —S—, —N=, or —O—; two or more hydrogen atoms of at least one of ring $B^3$ and ring $B^4$ are substituted by substitutes which may be the same or different and are selected from chlorine, fluorine, —CF$_3$—, —OCF$_3$, and —OCF$_2$H;

$Y^1$, $Y^2$, and $Y^3$ each independently represent a direct bond, —CH$_2$—CH$_2$-, —CF$_2$—CF$_2$-, —CH=CH—, —CF=CF—, —CH$_2$—O—, —O—CH$_2$—, —CF$_2$—O—, —O—CF$_2$—, —CH$_2$—S—, —S—CH$_2$—, —CF$_2$—S—, —S—CF$_2$—, —O—CF$_2$—C$_2$H$_4$—, —C$_2$H$_4$—CF$_2$—O—, —CO—O—, —O—CO—, —CH$_2$—CH$_2$—CO—O—, —O—CO—CH$_2$—CH$_2$—, or —C≡C—; R$^3$ and R$^4$ each independently represent an alkyl group having 1 to 6 carbon atoms or an alkenyl group having 2 to 6 carbon atoms;

j, k, and m each independently represent 0 or 1, provided that j+k+m≧1; and n represents 0 or 1.

Examples of the C1-C3 alkyl group and the C1-C3 alkoxy group that may be substituted for the hydrogen atom of the rings B$^1$, B$^2$, B$^3$, and B$^4$ in formula (II) include those enumerated above for the C1-C3 alkyl group and the C1-C3 alkoxy group that may be substituted for the hydrogen atom of the rings C$^1$, C$^2$, and C$^3$ in formula (I).

Examples of the C1-C6 alkyl group represented by R$^3$ and R$^4$ in formula (II) include methyl, ethyl, propyl, isopropyl, butyl, s-butyl, t-butyl, isobutyl, amyl, isoamyl, t-amyl, hexyl, 2-hexyl, and 3-hexyl. Examples of the C$_2$-C$_6$ alkenyl group represented by R$^3$ and R$^4$ in formula (II) include vinyl, 1-methylethenyl, 2-methylethenyl, 2-propenyl, 1-methyl-3-propenyl, 3-butenyl, 1-methyl-3-butenyl, isobutenyl, 3-pentenyl, and 4-hexenyl.

Of the liquid crystal compounds of general formula (II), preferred is the one represented by general formula (III), for the nematic liquid crystal composition containing the compound of formula (III) provides particularly excellent liquid crystal display characteristics.

[Chemical Formula 4]

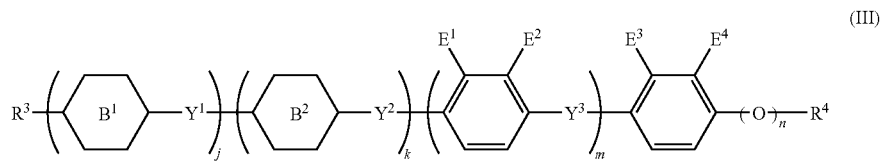

(III)

wherein ring B$^1$, ring B$^2$, Y$^1$, Y$^2$, Y$^3$, R$^3$, R$^4$, j, k, m, and n are as defined for general formula (II); E$^1$, E$^2$, E$^3$, and E$^4$ each represent hydrogen, chlorine, fluorine, —CF$_3$, —OCF$_3$, or —OCF$_2$H, provided that at least one of the E$^1$/E$^2$ combination and the E$^3$/E$^4$ combination consists of other than hydrogen.

Of the liquid crystal compounds of formula (III), preferred is the one in which E$^1$, E$^2$, E$^3$, and E$^4$ are each hydrogen or fluorine, namely the one in which one of the E$^1$/E$^2$ combination and the E$^3$/E$^4$ combination consists solely of fluorine atoms with the other consisting solely of hydrogen atoms or the one in which both the combinations consist solely of fluorine atoms, for the nematic liquid crystal composition containing this compound provides further improved display characteristics, such as response time, and reliability.

Examples of the compound represented by formula (II) include, but are not limited to, the following compounds. In formulae shown below, R$^{13}$ is C2-C5 alkyl, and R$^{14}$ is C1-C5 alkyl.

[Chemical Formula 5-1]

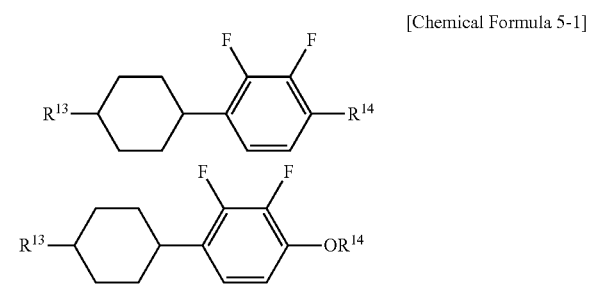

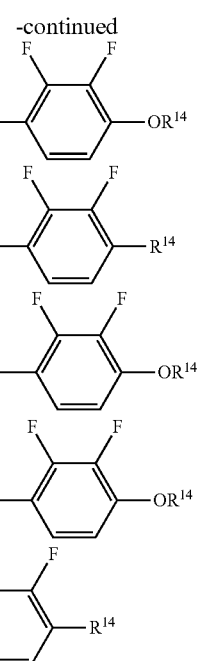

-continued

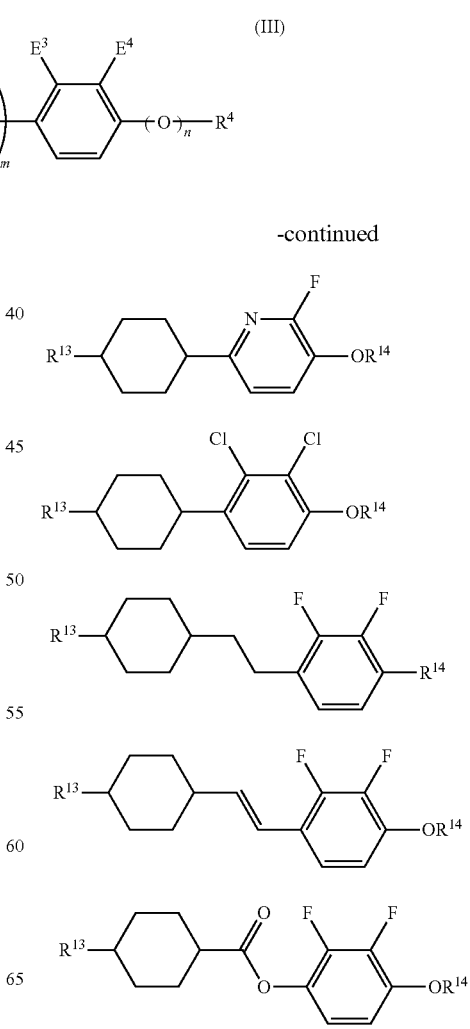

[Chemical Formula 5-2]
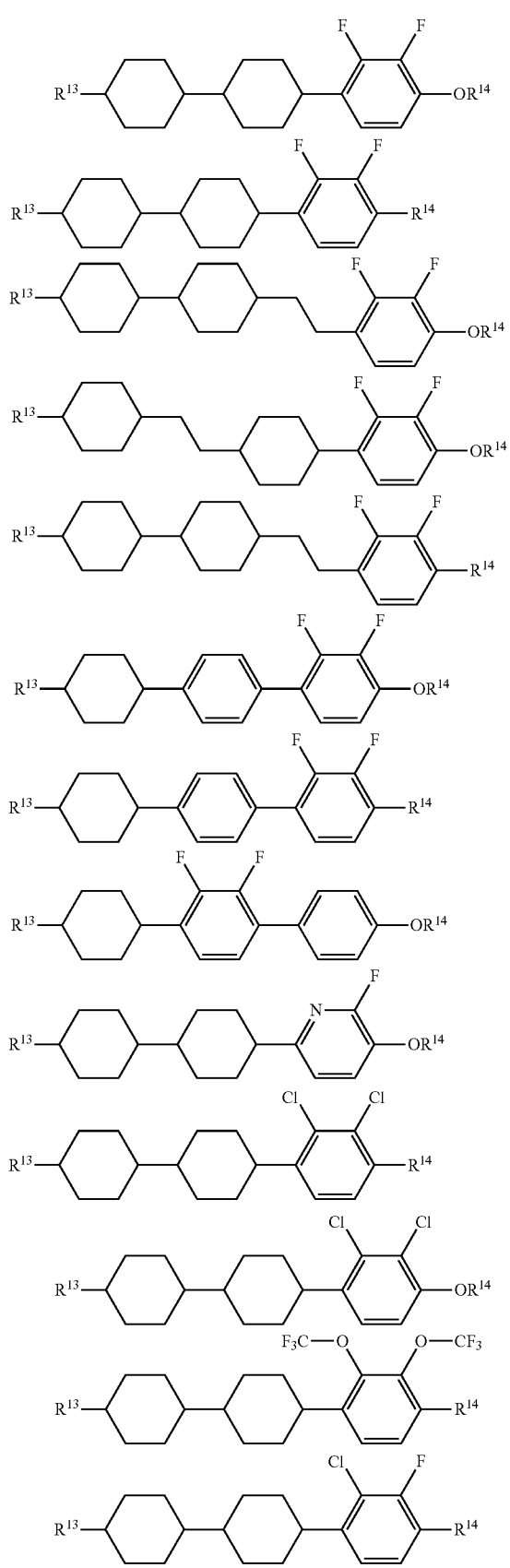
[Chemical Formula 5-3]
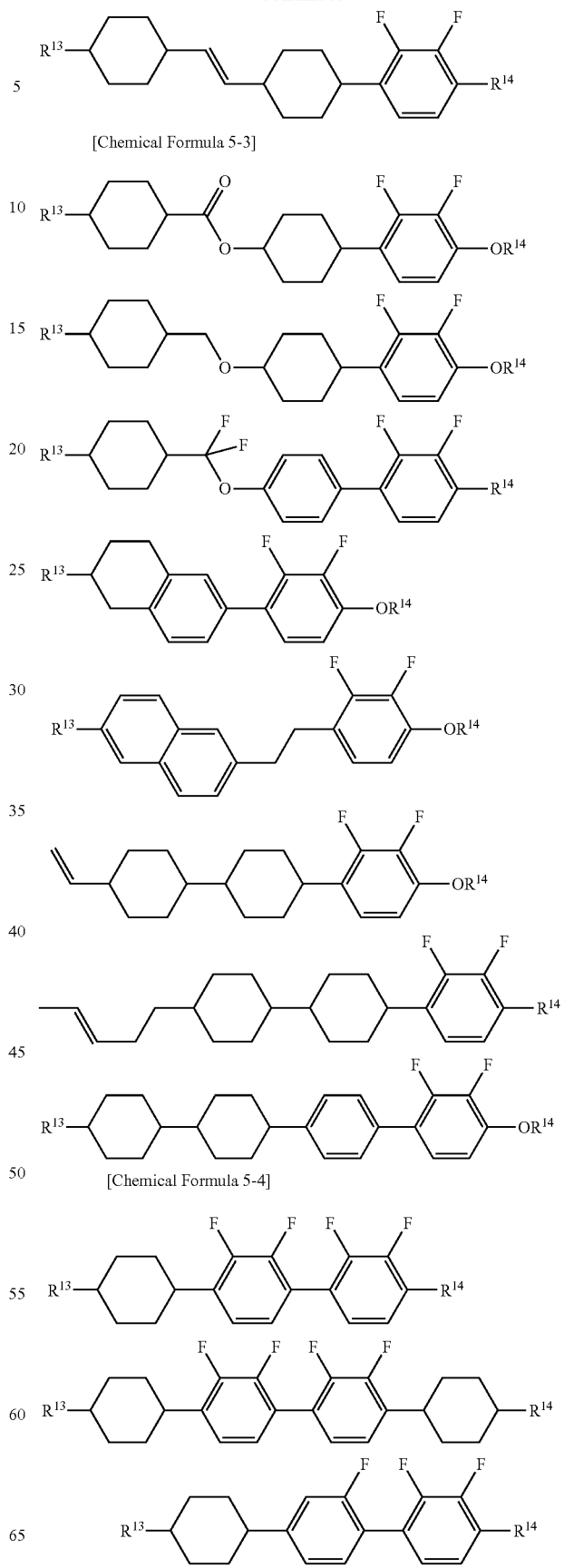
[Chemical Formula 5-4]

-continued
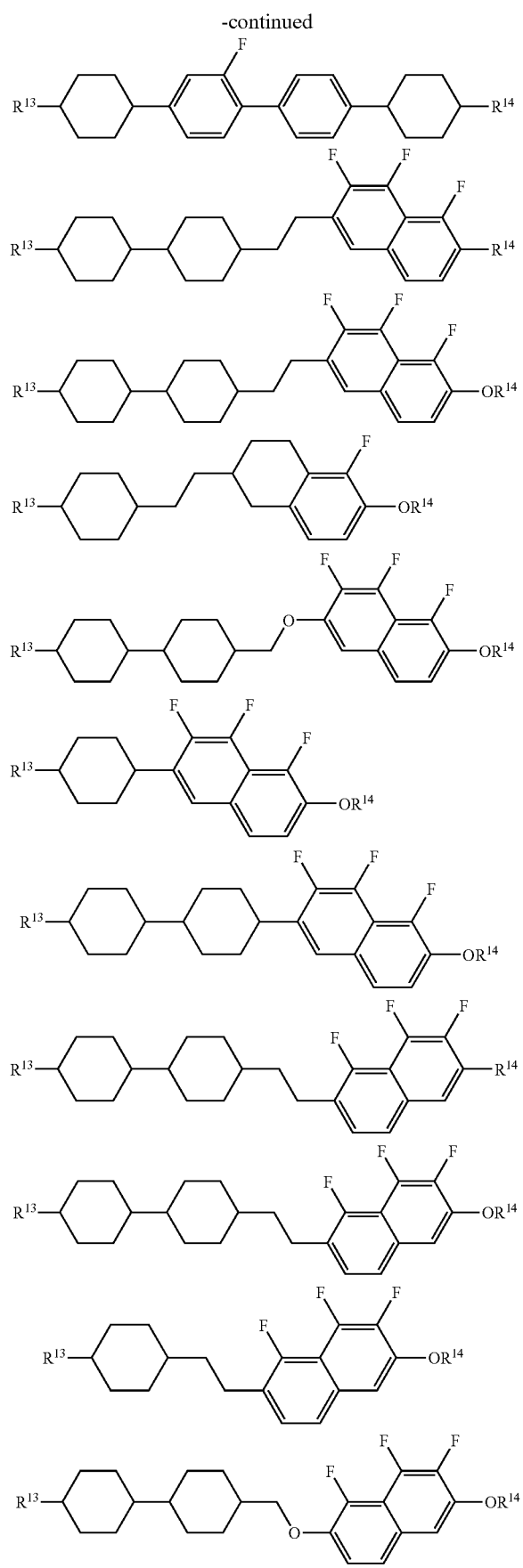
-continued
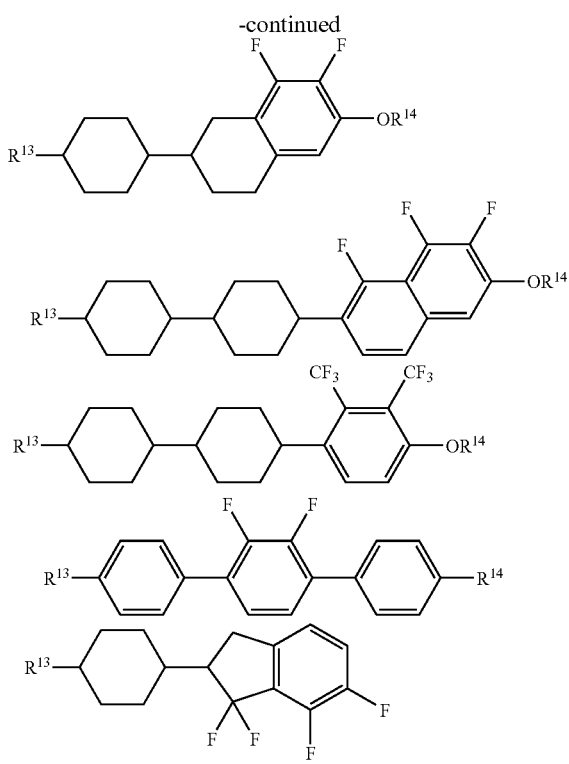
The following compounds are particularly preferred among the compounds shown above.
[Chemical Formula 6]
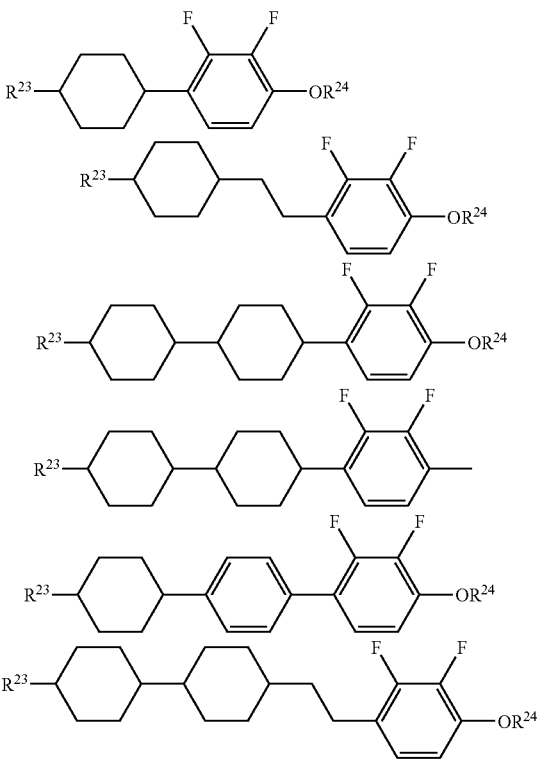
wherein $R^{23}$ is C2-C5 alkyl, and $R^{24}$ is C1-C5 alkyl.

It is more preferred that the nematic liquid crystal composition having negative dielectric anisotropy (Δ∈) further contain a liquid crystal compound represented by general formula (IV) shown below for providing further improved liquid crystal display characteristics. The content of the compound of formula (IV) is preferably 5% to 50% by mass, more preferably 10% to 50% by mass. When used in an amount less than 5%, the compound produces insufficient effects of use. Use of more than 50% of the compound tends to result in a reduction in VHR.

[Chemical Formula 7]

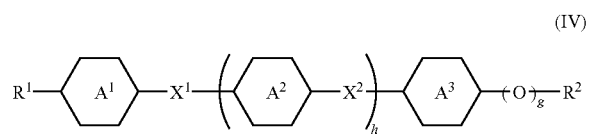

(IV)

wherein ring $A^1$, ring $A^2$, and ring $A^3$ each independently represent a benzene ring, a cyclohexane ring, a cyclohexene ring, a naphthalene ring, a decahydronaphthalene ring, or a tetrahydronaphthalene ring, one or more hydrogen atoms of which rings are optionally substituted by an alkyl group having 1 to 3 carbon atoms or an alkoxy group having 1 to 3 carbon atoms, a —CH═ moiety of which rings is optionally substituted by —N═, and a —CH²— moiety of which rings is optionally substituted by —S—, —N═, or —O—;

$X^1$, and $X^2$ each independently represent a direct bond, —CH₂—CH₂-, —CF₂—CF₂-, —CH═CH—, —CF═CF—, —CH₂—O—, —O—CH₂—, —CF₂—O—, —O—CF₂—, or —C≡C—;

$R^1$ and $R^2$ each independently represent an alkyl group having 1 to 6 carbon atoms or an alkenyl group having 2 to 6 carbon atoms; and g and h each independently represent 0 or 1.

Examples of the C1-C3 alkyl group and the C1-C3 alkoxy group that may be substituted for the hydrogen atom of the rings $A^1$, $A^2$, and $A^3$ in formula (IV) include those enumerated above for the C1-C3 alkyl group and the C1-C3 alkoxy group that may be substituted for the hydrogen atom of the rings $C^1$, $C^2$, and $C^3$ in formula (I).

Examples of the C1-C6 alkyl group and the C2-C6 alkenyl group represented by $R^1$ and $R^2$ in formula (IV) include those recited above for the C1-C6 alkyl group and the C2-C6 alkenyl group represented by $R^3$ and $R^4$ in formula (II).

Examples of the compound represented by formula (IV) include, but are not limited to, the following compounds.

[Chemical Formula 8]

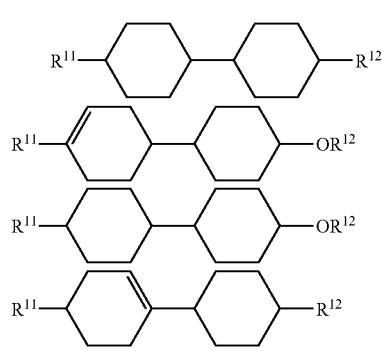

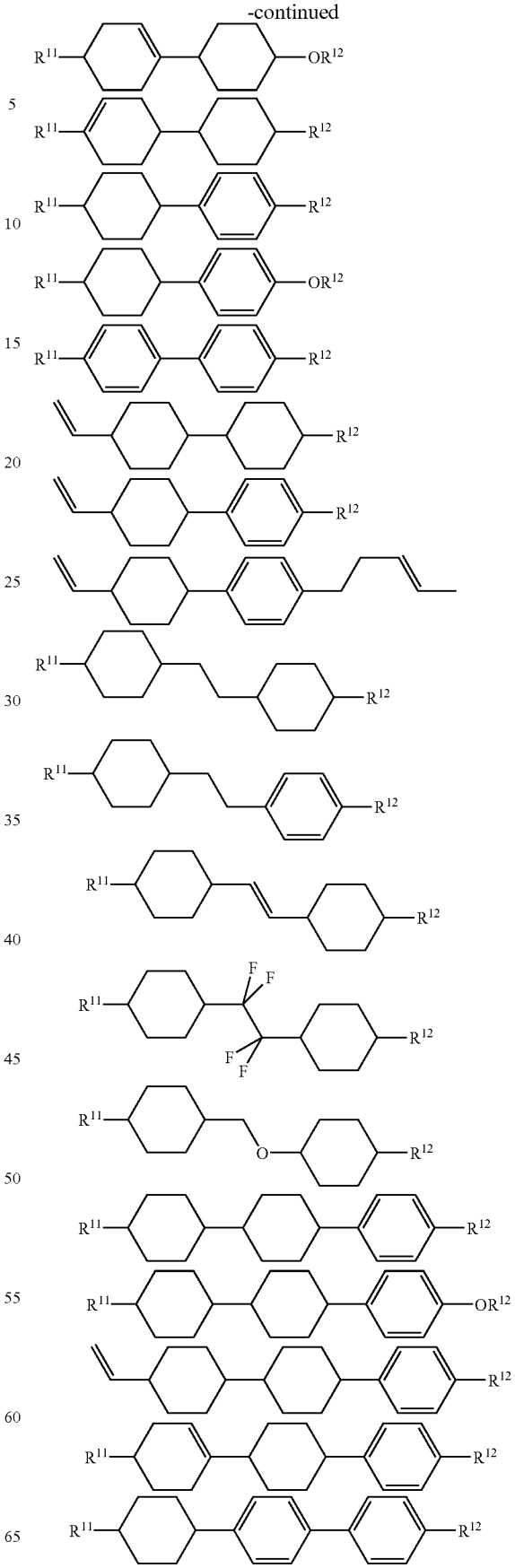

-continued

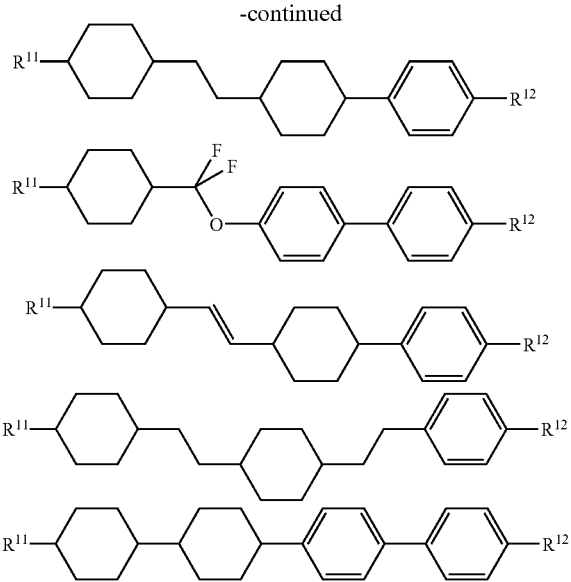

wherein $R^{11}$ and $R^{12}$ each represent a C1-C6 alkyl or C2-C6 alkenyl.

The following compounds are particularly preferred among the compounds shown above.

[Chemical Formula 9]

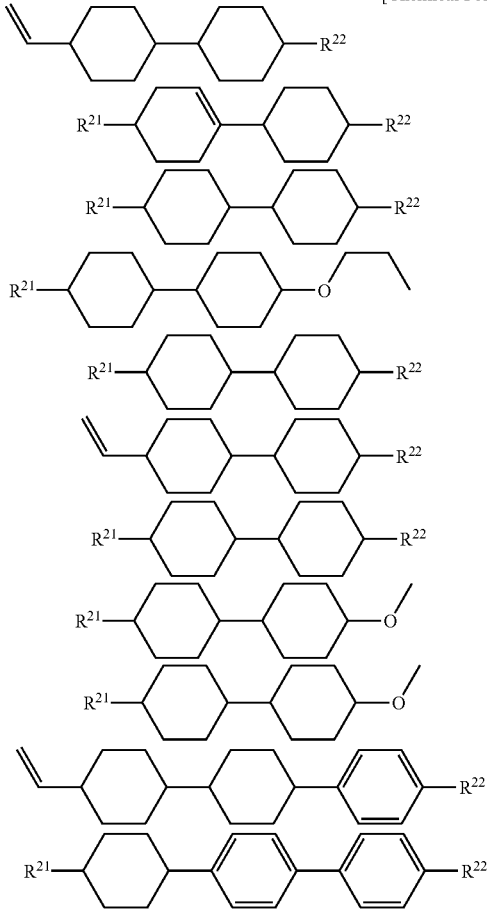

wherein $R^{21}$ and $R^{22}$ each represent C2-C5 alkyl or C2-C6 alkenyl.

The nematic liquid crystal composition for use in the liquid crystal composition of the invention may further contain other commonly used liquid crystal compounds within a range that secures negative dielectric anisotropy (Δ∈). Examples of such liquid crystal compounds include, but are not limited to, the following compounds. In chemical formulae below, $W^1$ is hydrogen or an optionally branched alkyl, alkoxy, alkenyl, alkenyloxy, alkynyl, alkynyloxy, alkoxyalkyl, alkanoyloxy, or alkoxycarbonyl group having 1 to 8 carbon atoms, each optionally being substituted with a halogen atom, a cyano group, etc.; $W^2$ is cyano, halogen, or a group represented by $W^1$; and $W^3$, $W^4$, and $W^5$ are each hydrogen, halogen, or cyano, provided that the compounds corresponding to the general formulae (II) and (IV) are excluded.

[Chemical Formula 10-1]

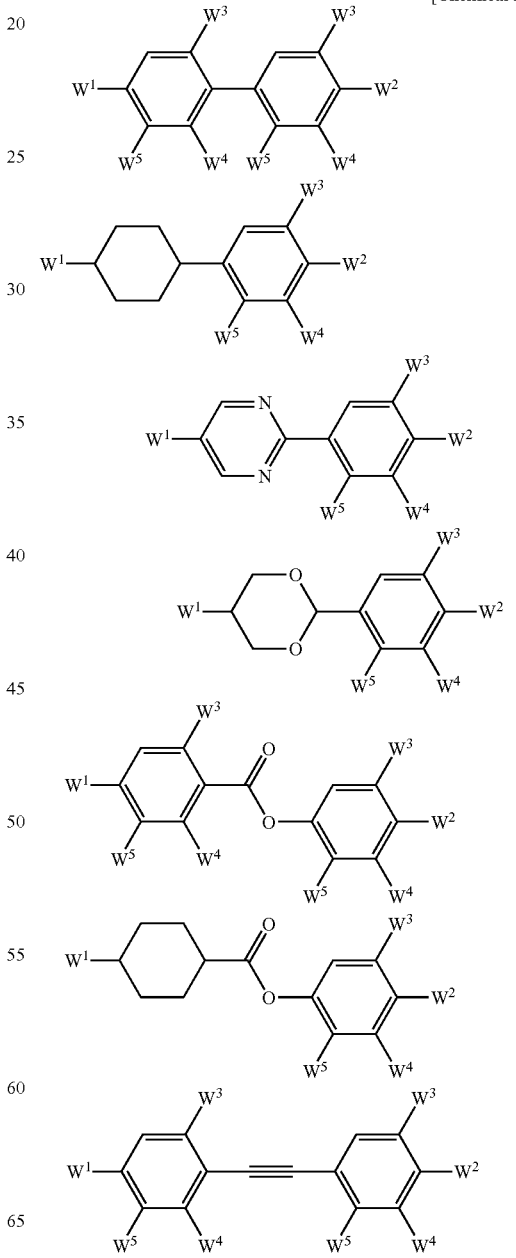

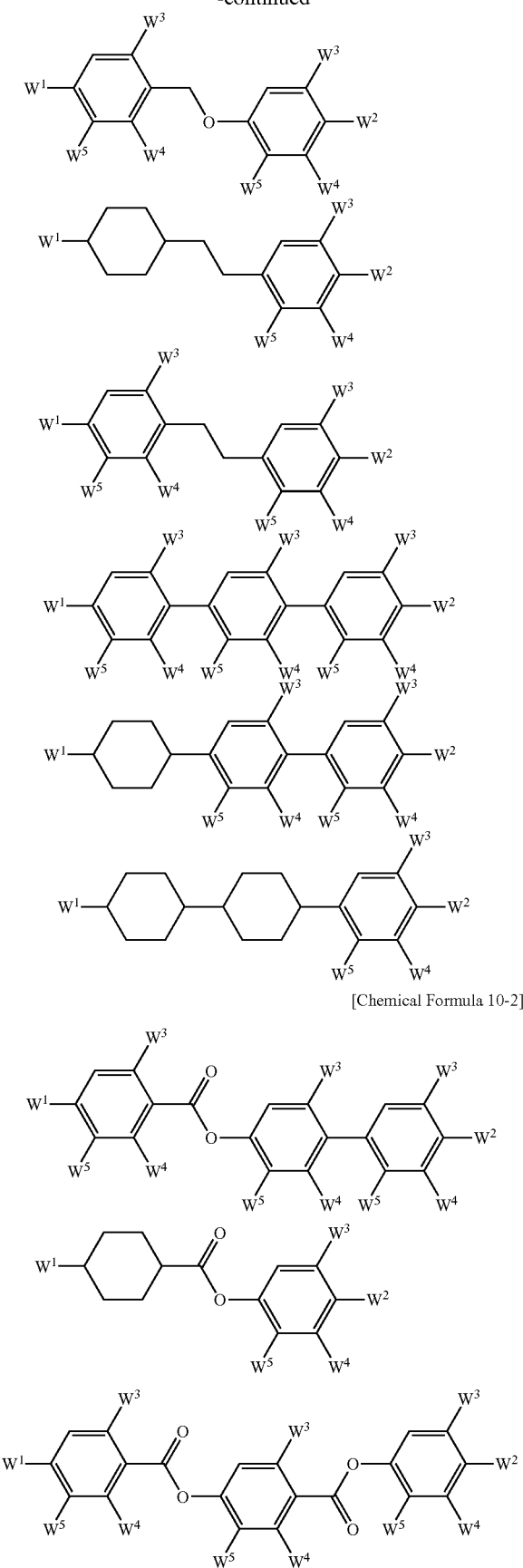
[Chemical Formula 10-2]
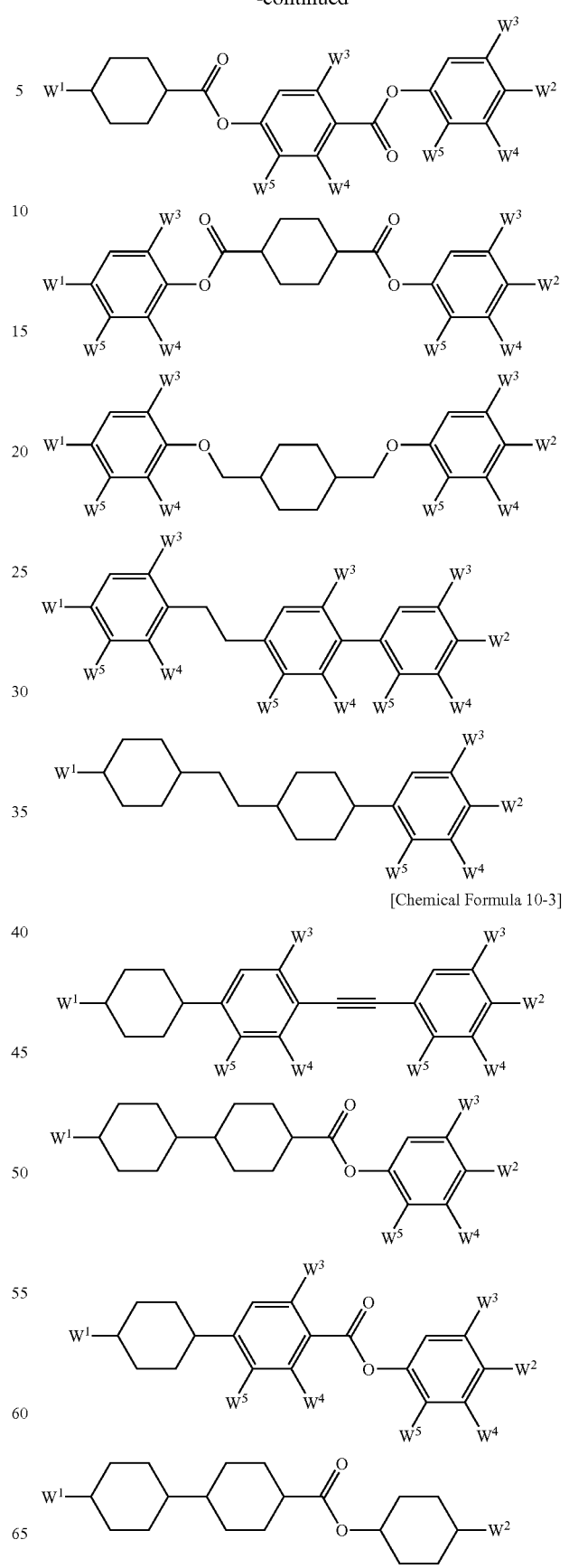
[Chemical Formula 10-3]

-continued

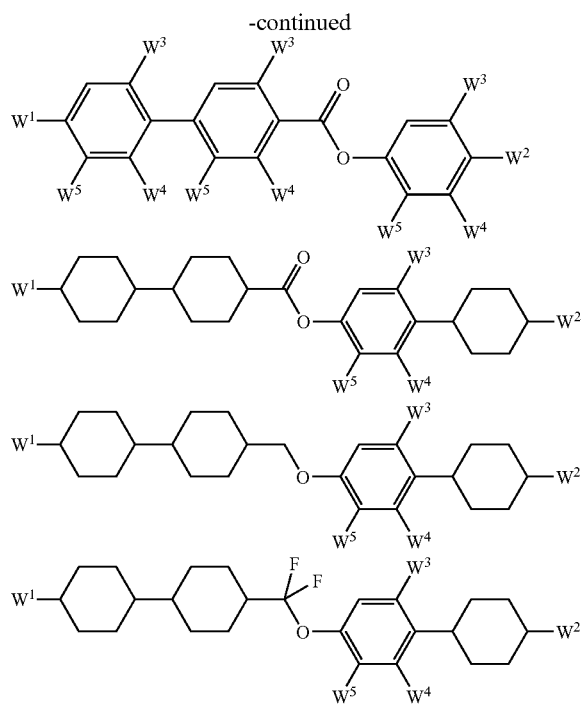

The liquid crystal composition of the invention may contain a photopolymerization initiator. The photopolymerization initiator for use in the invention may be any known compound, including benzoin ethers, such as benzoin butyl ether; benzyl ketals, such as benzyl dimethyl ketal; α-hydroxyacetophenones, such as 1-hydroxy-1-benzoylcyclohexane, 2-hydroxy-2-benzoylpropane, and 2-hydroxy-2-(4'-isopropyl)benzoylpropane; chloroaceto phenones, such as 4-butylbenzoyltrichloromethane and 4-phenoxybenzoyldichloromethane; α-aminoacetophenones, such as 1-benzyl-1-dimethylamino-1-(4'-morpholinobenzoyl)propane, 2-morpholyl-2-(4'-methylmercapto)benzoylpropane, 9-n-butyl-3,6-bis(2'-morpholinoisobutyroyl)carbazole, and 2-methyl-1-[4-(methylthio)phenyl]-2-morpholinopropan-1-one;
acylphosphine oxides, such as bis(2,4,6-trimethylbenzoyl)-phenylphosphine oxide; α-dicarbonyls, such as benzil and methylbenzoyl formate; triazines, such as p-methoxyphenyl-2,4-bis(trichloromethyl)-s-triazine, 2-methyl-4,6-bis(trichloromethyl)-s-triazine, 2-phenyl-4,6-bis(trichloromethyl)-s-triazine, 2-naphthyl-4,6-bis(trichloromethyl)-s-triazine, and 2-(p-butoxystyryl)-s-triazine; a-acyloxime esters, such as those described in JP 2000-80068A, JP 2001-233842A, JP 2005-97141A, JP 2006-516246A, Japanese Patents 3860170 and 3798008, and WO2006/018973; benzoyl peroxide, 2,2'-azobisisobutyronitrile, ethylanthraquinone, 1,7-bis(9'-acridinyl)heptane, thioxanthone, 1-chloro-4-propoxythioxanthone, isopropylthioxanthone, diethylthioxanthone, benzophenone, phenyl biphenyl ketone, 4-benzoyl-4'-methyldiphenyl sulfide, 2-(p-butoxystyryl)-5-trichloromethyl-1,3,4-oxadiazole, 9-phenylacridine, 9,10-dimethylbenzphenazine, benzophenone/Michler's ketone, hexaarylbiimidazole/mercaptobenzimidazole, and thioxanthone/amine Inter alia, benzoin ethers, benzyl ketals, α-hydroxyacetophenones, and α-aminoacetophenones are preferred.

A combination of the photopolymerization initiator and a sensitizer is also preferably used. Examples of useful sensitizers are thioxanthone, phenothiazine, chlorothioxanthone, xanthone, anthracene, dipyhenylanthracene, and rubrene.

The total amount of the photopolymerization initiator and/or the sensitizer, if added, is preferably 10 parts by mass or less, more preferably 5 parts by mass or less, even more preferably 0.1 to 3 parts by mass, per 100 parts by mass of the polymerizable compound of formula (I).

Additives may be added to the liquid crystal composition of the invention where needed to improve characteristics of the polymerizable composition, including functional compounds, such as storage stabilizers, antioxidants, ultraviolet absorbers, infrared absorbers, fine particles of organic, inorganic or other materials, and polymers.

The storage stabilizers serve to improve storage stability of the liquid crystal composition, including hydroquinone, hydroquinone monoalkyl ethers, tert-butyl catechols, pyrogallols, thiophenols, nitro compounds, 2-naphtylamines, and 2-hydroxynaphthalenes. The amount of the storage stabilizer, if used, is preferably 1 part by mass or less, more preferably 0.5 parts by mass or less, per 100 parts by mass of the polymerizable compound.

Any known antioxidants may be used, including hydroquinone, 2,6-di(tert-butyl)-p-cresol, 2,6-di(tert-butyl)phenol, triphenyl phosphite, and trialkyl phosphites.

Any known UV absorbers may be used, including salicylic ester compounds, benzophenol compounds, benzotriazole compounds, triazine compounds, cyanoacrylate compounds, and nickel complex salt compounds.

The above mentioned additives may be used appropriately with no particular limitation as long as the characteristics of the resulting polymer are not impaired. Preferably, the total amount of these optional components is not more than 30 parts by mass, more preferably 10 parts by mass or less, per 100 parts by mass of the sum of the nematic liquid crystal compound having negative dielectric anisotropy ($\Delta\in$) and the polymerizable compound represented by the general formula (I).

The liquid crystal composition of the invention is used by polymerizing the polymerizable compound by known processes using light, electromagnetic radiation, or heat. Examples of the preferred light include ultraviolet light, visible light, and infrared light. Electromagnetic radiation, such as electron beams and X rays, may also be used. Usually, ultraviolet light or visible light is preferred. A preferred wavelength range is from 150 to 500 nm, more preferably from 250 to 450 nm, even more preferably 300 to 400 nm Light sources include low pressure mercury lamps (e.g., bactericidal lamps, fluorescent chemical lamps, and black lights), high pressure discharge lamps (e.g., high pressure mercury lamps and metal halide lamps), and short arc discharge lamps (ultrahigh pressure mercury lamps, xenon lamps, and mercury xenon lamps), with high pressure mercury lamps and ultrahigh pressure mercury lamps being preferred. The liquid crystal composition may be irradiated with the light as emitted from a light source or a light ray of a specific wavelength or light rays of a specific wavelength range selected through a filter. A preferred irradiation energy density is 10 to 50000 mJ/cm$^2$, more preferably 10 to 20000 mJ/cm$^2$. A preferred illuminance is 0.1 to 5000 mW/cm$^2$, more preferably 1 to 2000 mW/cm$^2$. With a small amount of exposure, the polymerization is insufficient. Too large an amount of exposure can result in a reduction in VHR.

The electrooptical display device of the present invention is then described. The electrooptical display device of the invention is produced by sandwiching the liquid crystal composition of the invention between two substrates at least one of which has an electrode for applying a voltage to liquid crystal molecules, irradiating the liquid crystal composition with an energy ray, such as an ultraviolet ray, to cause the polymerizable compound represented by general formula (I) to polymerize.

The substrate may be selected as appropriate to the intended driving system and display system from those conventionally used in electrooptical display devices with no particularly restrictions. Examples of the energy ray include the above described light, electromagnetic radiation, and heat as well as an ultraviolet ray.

The electrooptical display device of the invention may be of AM drive type or passive matrix (PM) drive type. An LCD driven in an AM or PM scheme is applicable to any of reflective, transmissive, and semi-transmissive LCDs.

The electrooptical display device of the invention is also useful as a dynamic scattering (DS) mode device using a liquid crystal composition containing an electroconductive agent, a nematic curvilinear aligned phase (NCAP) device prepared by microencapsulating a liquid crystal composition, and a polymer dispersed (PD) device using a liquid crystal composition having a three dimensional network polymer structure, for example, a polymer network (PN) device.

Having the aforementioned characteristics, the liquid crystal composition of the invention is particularly suited for use in AM LCDs having a display mode utilizing a negative dielectric anisotropy, such as a VA mode and an IPS mode, especially AM LCDs having a VA display mode.

In VA mode LCDs, the direction of the electric field applied is perpendicular to the liquid crystal layer, while in IPS mode LCDs, the direction of the electric field is in parallel to the liquid crystal layer. The structure of VA mode LCDs is reported, e.g., in K. Ohmuro, S. Kataoka, T. Sasaki and Y. Koike, *SID '97 Digest of Technical Papers*, vol. 28, p. 845 (1997), and the structure of IPS mode LCDs is reported, e.g., in WO91/10936 (U.S. Pat. No. 5,576,867).

The electrooptical display devices having the liquid crystal composition of the invention are applicable to watches, calculators, measuring instruments, automotive panels, copiers, cameras, business machines, PDAs, notebook or desktop computer monitors, TV monitors, cell phones, light control glass, optical shutters, and replacement polarizers. The characteristics of the electrooptical display devices of the invention are particularly taken advantage of in applications to large PDAs, notebook or desktop computer monitors, and TV monitors.

EXAMPLES

The present invention will now be illustrated in greater detail with reference to Examples, but it should be understood that the invention is not deemed to be limited thereto. Unless otherwise noted, all the parts and percents given below are by mass.

Nematic liquid crystal compositions having negative $\Delta \in$ for use in the invention were prepared in Reference Example. Polymerizable compounds of the invention and comparative polymerizable compounds were synthesized in Synthesis Examples.

In Examples 1 and Comparative Examples 1, liquid crystal compositions containing a varied amount of a polymerizable compound of the invention were prepared and compared as to various characteristics.

In Examples 2 and Comparative Examples 2, a polymerizable compound of the invention or a comparative polymerizable compound was compounded into a nematic liquid crystal composition for use in the invention to prepare polymerizable compound-containing liquid crystal compositions (hereinafter also referred to as polymerizable liquid crystal compositions), which were compared as to solubility, and the alignment properties of these polymerizable liquid crystal compositions were evaluated in Evaluation Example 1.

In Examples 3, liquid crystal compositions of the invention were prepared using nematic liquid crystal compositions having different formulations. The liquid crystal compositions prepared in Examples 2 and 3 were evaluated for VHR in Evaluation Example 2.

The response time of the polymerizable liquid crystal compositions of Examples 2 was measured in Evaluation Example 3.

The polymerizable liquid crystal compositions of Examples 2 were compared in terms of polymerization reactivity in Evaluation Example 4.

The polymerizable liquid crystal compositions of Examples 2 were compared as to VHR as measured at varied temperatures in Evaluation Example 5.

Reference Example

Liquid crystal composition Nos. 1 to 4 were prepared using liquid crystal compound Nos. 1 to 16 according to the formulations shown in Table 1. Liquid crystal compound Nos. 1 to 7 correspond to general formula (IV), liquid crystal compound Nos. 8 to 13 correspond to general formula (II), and liquid crystal compound Nos. 14 to 16 are other liquid crystal compounds.

[Chemical Formula 11]

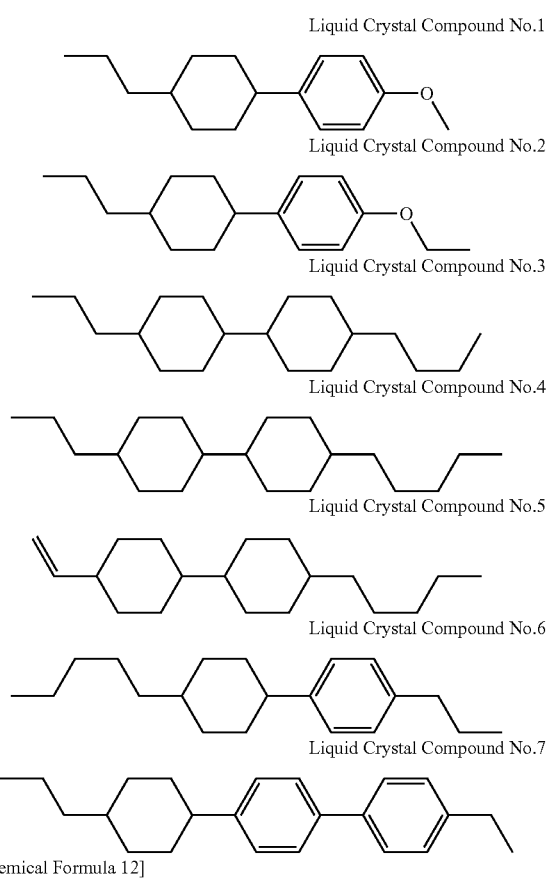

[Chemical Formula 12]

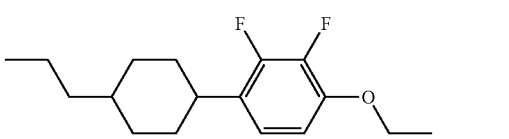

Liquid Crystal Compound No.9

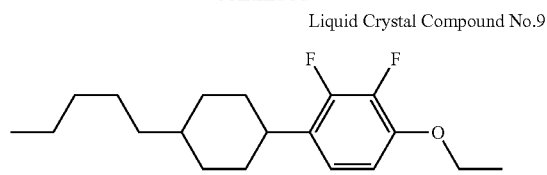

Liquid Crystal Compound No.10

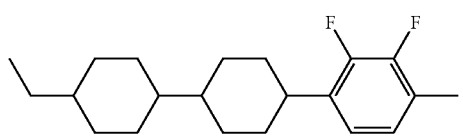

Liquid Crystal Compound No.11

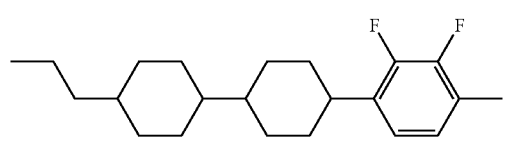

Liquid Crystal Compound No.12

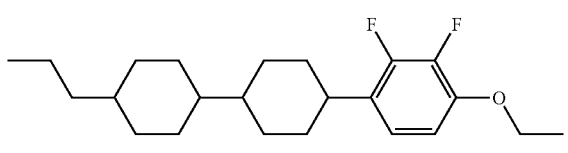

Liquid Crystal Compound No.13

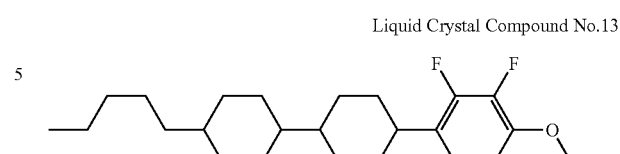

[Chemical Formula 13]

Liquid Crystal Compound No.14

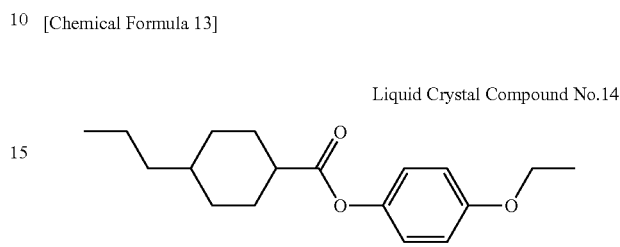

Liquid Crystal Compound No.15

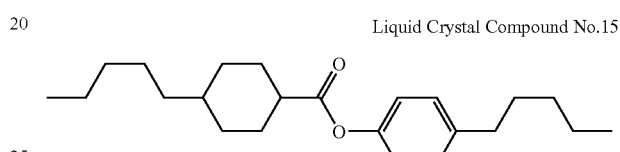

Liquid Crystal Compound No.16

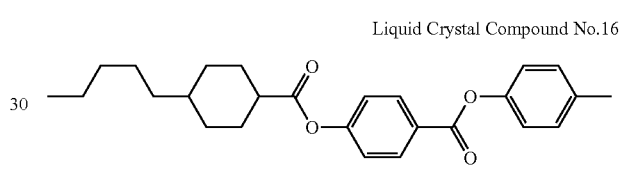

TABLE 1

| | Liquid Crystal Compound | | Liquid Crystal Composition No. | | | |
|---|---|---|---|---|---|---|
| | General Formula | No. | 1 | 2 | 3 | 4 |
| Formulation (part) | (IV) | 1 | 5 | 3 | 3 | 4 |
| | | 2 | 0 | 5 | 10 | 0 |
| | | 3 | 8 | 5 | 4 | 7 |
| | | 4 | 9 | 6 | 5 | 8 |
| | | 5 | 0 | 25 | 25 | 0 |
| | | 6 | 7 | 5 | 4 | 6 |
| | | 7 | 0 | 5 | 10 | 0 |
| | (II) | 8 | 14 | 9 | 8 | 13 |
| | | 9 | 13 | 8 | 7 | 12 |
| | | 10 | 10 | 7 | 5 | 9 |
| | | 11 | 9 | 6 | 5 | 8 |
| | | 12 | 13 | 8 | 7 | 12 |
| | | 13 | 12 | 8 | 7 | 11 |
| | Others | 14 | 0 | 0 | 0 | 7 |
| | | 15 | 0 | 0 | 0 | 1 |
| | | 16 | 0 | 0 | 0 | 2 |
| Ratio (%) of compounds corresponding to general formula (IV) | | | 29 | 54 | 61 | 25 |
| Ratio (%) of compounds corresponding to general formula (II) | | | 71 | 46 | 39 | 65 |
| Ratio (%) of Other Compounds | | | 0 | 0 | 0 | 10 |
| Dielectric Anisotropy ($\Delta\epsilon$) | | | negative | negative | negative | negative |

Synthesis Example

Synthesis of Polymerizable Compounds

Polymerizable compound No. 1 was synthesized in accordance with steps 1 to 3 described below.

Step 1:

A benzyl ether compound was synthesized as follows according to reaction scheme 1:

(Reaction Scheme 1)

[Chemical Formula 14]

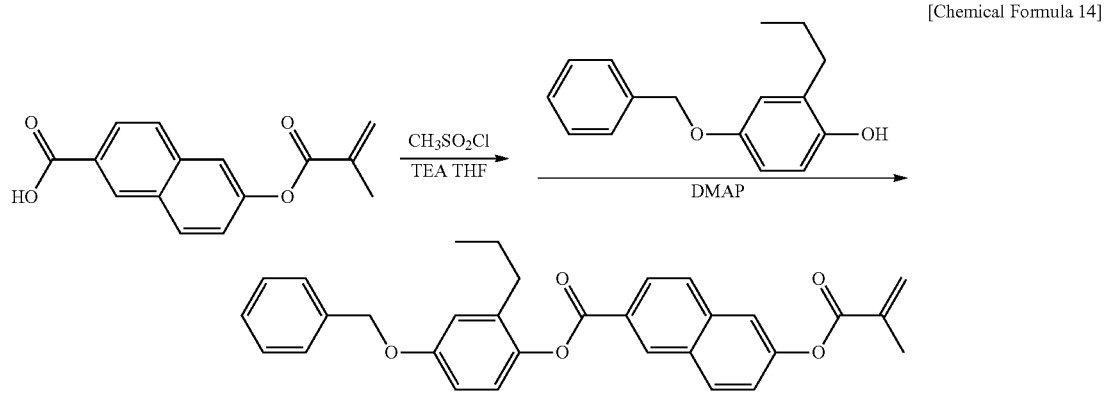

In 40 g of THF was dissolved 7.00 g (27.32 mmol) of 6-methacryloyloxy-2-naphthoic acid. After cooling the solution to −30° C., 4.69 g (40.97 mmol) of methanesulfonyl chloride was added thereto, and 8.57 g (84.68 mmol) of triethylamine (TEA) was added thereto dropwise, followed by stirring for 1 hour. To the mixture was added 33 mg (0.27 mmol) of 4-dimethylaminopyridine (DMAP), and a solution of 6.95 g (28.68 mmol) of 4-benzyloxy-2-n-propylphenol in 15 g of THF was added thereto dropwise, followed by stirring for 1 hour. The reaction mixture was washed with water, and the solvent was removed by evaporation. The residue was purified by column chromatography on $SiO_2$ (developing solvent: dichloromethane). Recrystallization from acetone gave 6.40 g of the benzyl ether compound as a white solid in a yield of 48.7%.

Step 2:

A phenol compound was synthesized from the benzyl ether compound obtained in step 1 in accordance with reaction scheme:

In 20 g of anisole was dissolved 5.3 g (40.0 mmol) of anhydrous aluminum chloride. A solution of 6.40 g (13.3 mmol) of the benzyl ether compound obtained in step 1 in 20 g of anisole was dropwise added to the solution while cooling with ice-water, followed by stirring for 1 hour. After the reaction system was allowed to warm to room temperature, hydrochloric acid was added thereto dropwise to dissolve the precipitate. The reaction mixture was washed with water, and the solvent was removed by evaporation. The residue was purified by column chromatography on $SiO_2$ (developing solvent: ethyl acetate/toluene). Recrystallization from an acetone/methanol mixed solvent gave 3.62 g of the phenol compound as white crystals in a yield of 69.7%.

Step 3:

Polymerizable compound No. 1 was synthesized using the phenol compound obtained in step 2 as follows in accordance with reaction scheme 3:

(Reaction Scheme 2)

[Chemical Formula 15]

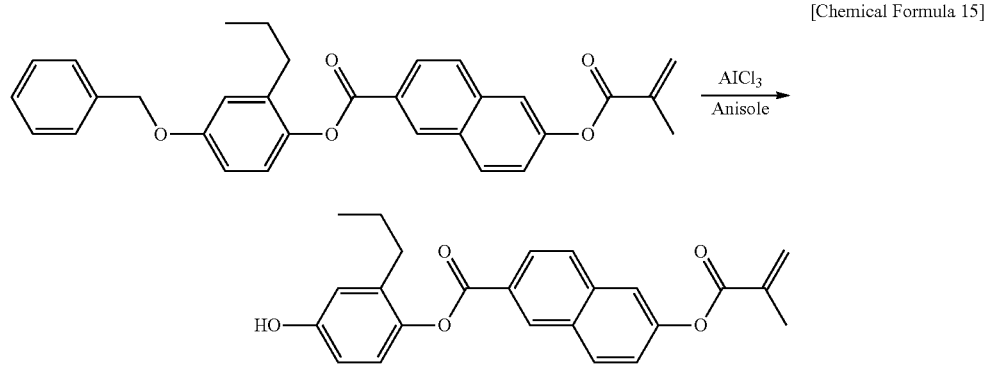

(Reaction Scheme 3)

[Chemical Formula 16]

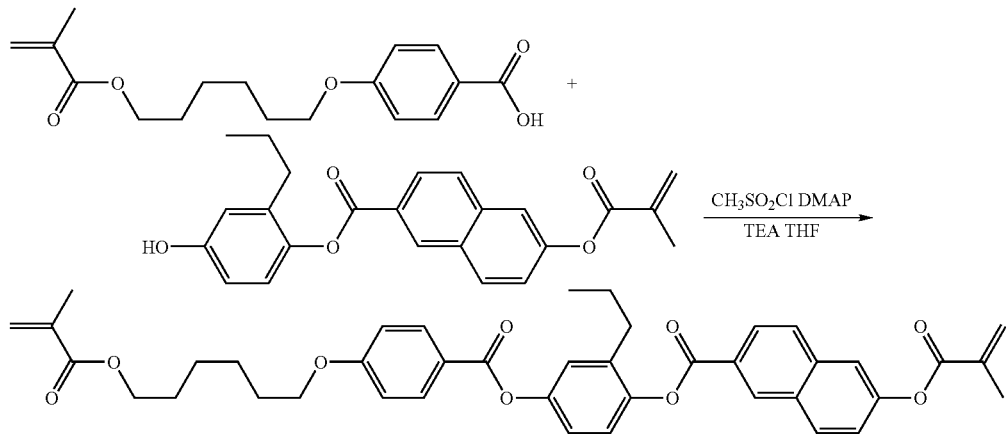

In 8 g of THF was dissolved 1.87 g (6.10 mmol) of 4-(6-methacryloxy-hexyloxy)-benzoic acid, and the solution was cooled to −30° C. To the solution was added 0.77 g (6.71 mmol) of methanesulfonyl chloride, and 1.48 g (14.6 mmol) of triethylamine was then added thereto dropwise. After stirring for 1 hour, 7 mg (0.06 mmol) of DMAP was added, and a solution of 2.5 g (6.40 mmol) of the phenol compound obtained in step 2 in 10 g of THF was added thereto dropwise, followed by stirring for 1 hour. The reaction mixture was washed with water, and the solvent was removed by evaporation. The residue was purified by column chromatography on SiO$_2$ (developing solvent: ethyl acetate/toluene). Recrystallization from an ethyl acetate-hexane mixed solvent afforded 1.45 g of polymerizable compound No. 1 as a white solid in a yield of 35.0%. The analytical results of the resulting polymerizable compound No. 1 are shown below.

Analytical Results:

IR (KBr), cm$^{-1}$:
2952, 2870, 1736, 1710, 1634, 1606, 1511, 1491, 1474, 1279, 1257, 1186, 1170, 1150, 1133, 1112, 1083, 1069, 910, 764, 480

$^1$H-NMR (CDCl$_3$), ppm:
0.9(t;3H), 1.5-1.9(m;10H), 2.0(s;3H), 2.1(s;3H), 2.6(q; 2H), 4.1(t;2H), 4.2(t;2H), 5.6(s;1H), 5.8(s;1H), 6.1(s;1H), 6.5(s;1H), 7.0-7.4(m;6H), 7.7-8.3(m;6H), 8.8(s;1H)

[Chemical Formula 18]

Polymerizable compound No. 1 obtained was analyzed on a differential scanning calorimeter (DSC 7 from Perkin Elmer) under conditions of a nitrogen atmosphere of 50 ml/min, a heating rate of 5° C./min, and a heating temperature of from 25° C. up to 180° C. As a result, the compound exhibited the phase transition behavior shown below. The liquid crystal phase was identified by observing a sample sandwiched between glass plates and heated on a hot stage under a polarizing microscope.

[Chemical Formula 17]

Cr: crystal phase; N: nematic phase; I: isotropic liquid

Polymerizable compound Nos. 2 to 7, 11, and 41 to 44 and comparative polymerizable compound Nos. 3 to 8 in comparative polymerizable compounds shown below were synthesized in accordance with the procedures used to prepare polymerizable compound No. 1 or any known synthesis procedures.

Comparative Polymerizable Compound No.1

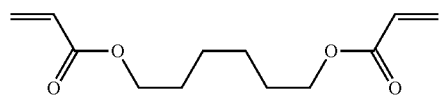

Comparative Polymerizable Compound No.2

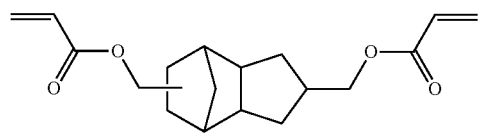

Comparative Polymerizable Compound No.3

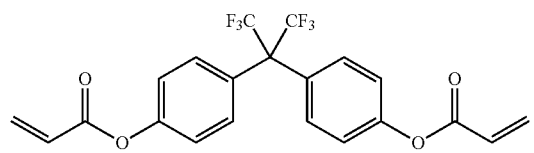

Comparative Polymerizable Compound No.4

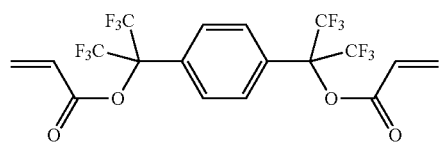

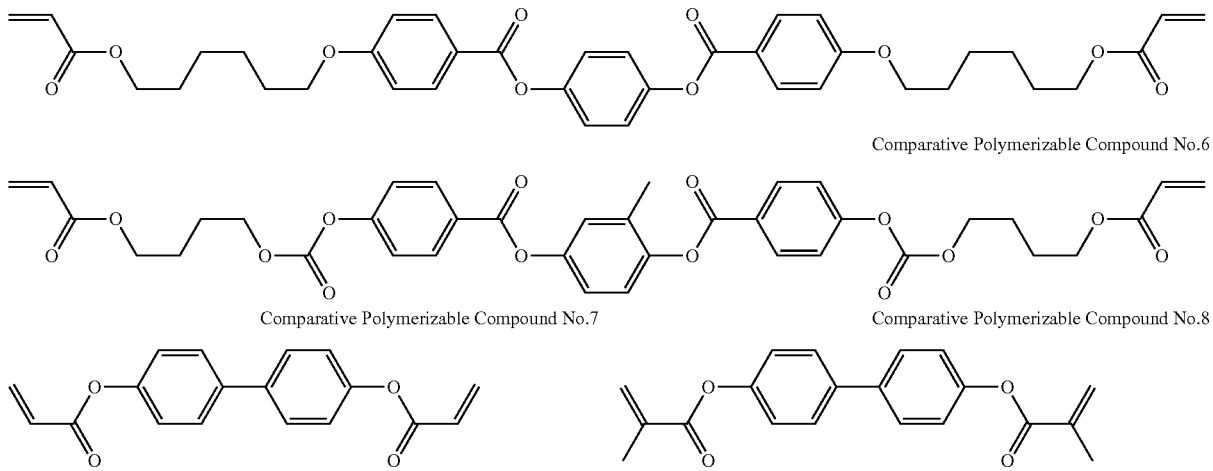

Examples and Comparative Examples which follow were carried out using liquid crystal composition Nos. 1 through 4 obtained in Reference Example, polymerizable compound Nos. 1 through 7, 11, and 41 to 44, comparative polymerizable compound Nos. 3 to 8, which were prepared in Synthesis Examples, and comparative polymerizable compound Nos. 1 and 2, which are commercially available. Comparative polymerizable compound No. 1 is KS-HDDA from Nippon Kayaku Co., Ltd. Comparative polymerizable compound No. 2 is DCP-A from Kyoeisha Chemical Co., Ltd.

Examples 1-1 to 1-7 and Comparative examples 1-1 to 1-3

Comparison of Mixing Ratio

Preparation of Polymerizable Compound-Containing Liquid Crystal Composition:

Polymerizable compound No. 1 was mixed with liquid crystal composition No. 1 in the amount shown in Table 2 per 100 parts of the composition. Irgacure 651 from Ciba Specialty Chemicals Corp. was added thereto as a photopolymerization initiator in an amount of 2% with respect to the polymerizable compound to provide a polymerizable compound-containing liquid crystal composition. In Comparative Example 1-1, either a polymerizable compound or a photopolymerization initiator was not added to liquid crystal composition No. 1.

The resulting polymerizable compound-containing liquid crystal compositions were evaluated for solubility, alignment properties, VHR, and response time in accordance with the following methods of measurement or evaluation.

(1) Solubility

The solubility of the polymerizable liquid crystal compositions was examined. A composition that dissolved at room temperature was rated "AA". A composition that dissolved on heating was rated "A". A composition that dissolved upon heating but crystallized out when left to stand at room temperature for one day was rated "B". A composition that did not completely dissolve even under heating was rated "C".

(2) Alignment Properties

A test cell for liquid crystal evaluation (cell gap: 5 μm; electrode area: 8 mm×8 mm; alignment film: JALS 2096) was filled with each of the polymerizable liquid crystal compositions, sealed the inlet with a sealant, and irradiated with light of 1000 mJ/cm² using a high pressure mercury lamp to make a sample. The sample was observed with the naked eye under a polarizing microscope (between crossed polarizers, with voltage off). A sample showing good alignment was rated "good". A sample showing disturbed alignment was rated "no good".

(3) VHR (After Irradiation)

The sample prepared in (2) above was subjected to VHR measurement using VHR-A1 available from Toyo Corp. under conditions of a voltage pulse width of 60 μs, a frame time of 16.7 ms, an amplitude of ±5 V, and a measuring temperature of 25° C.

(4) Response Time

The sample prepared in (2) above was subjected to response time measurement using LCD-5100 from Otsuka Electronics Co., Ltd. at a measuring temperature of 25° C.

The results of evaluation and measurement are shown in Table 2.

TABLE 2

| | Polymerizable Compound No. 1 (part) | Solubility | Alignment Properties | VHR (%) | Response Time (ms) |
|---|---|---|---|---|---|
| Comparative Example 1-1 | 0 | — | good | 99.3 | 53 |
| Example 1-1 | 0.05 | AA | good | 99.3 | 47 |
| Example 1-2 | 0.1 | AA | good | 99.3 | 46 |
| Example 1-3 | 0.3 | AA | good | 99.3 | 44 |
| Example 1-4 | 0.5 | AA | good | 99.3 | 44 |
| Example 1-5 | 0.8 | AA | good | 99.3 | 44 |
| Example 1-6 | 1 | AA | good | 99.3 | 41 |
| Example 1-7 | 2 | AA | good | 99.1 | 39 |
| Comparative Example 1-2 | 5 | A | good | 98.9 | 79 |
| Comparative Example 1-3 | 10 | C | — | — | — |

As is apparent from the results in Table 2, adding more than 3 parts of the polymerizable compound per 100 parts of the liquid crystal composition causes a large reduction in response speed and a reduction in solubility. It is also seen that the response is slow in the absence of the polymerizable compound.

Examples 2-1 to 2-12 and Comparative Examples 2-1 to 2-8

Comparison of Solubility

One part of each of polymerizable compound Nos. 1 to 7, 11, and 41 to 44 and comparative polymerizable compound Nos. 1 to 8 and 99 parts of liquid crystal composition No. 1 were compounded, and Irgacure 651 from Ciba Specialty Chemicals Corp. was added thereto as a photopolymerization initiator in an amount of 2% with respect to the polymerizable compound to provide a polymerizable compound-containing liquid crystal composition.

The solubility of the resulting polymerizable liquid crystal compositions was examined A composition that dissolved at room temperature was rated "AA". A composition that dissolved on heating was rated "A". A composition that dissolved upon heating but crystallized out when left to stand at room temperature for one day was rated "B". A composition that did not completely dissolve even under heating was rated "C". The results of evaluation are shown in Table 3.

compositions containing the comparative polymerizable compounds show reduced solubility.

Evaluation Example 1

Comparison of Alignment Properties

The polymerizable compound-containing liquid crystal compositions of Examples 2-1, 2-2, 2-3, 2-8, 2-9, 2-10, 2-11, and 2-12 and Comparative Examples 2-1, 2-2, 2-3, and 2-6 and the polymerizable compound-free liquid crystal composition of Comparative Example 1-1 were evaluated for alignment properties in the same manner as in Example 1-1. The results of evaluation are shown in Table 4. Polarizing micrographs of the samples between crossed polarizers are shown in FIGS. 1 and 2. The polymerizable compound-containing liquid crystal compositions of Comparative Examples 2-1, 2-2, 2-3, and 2-6 were rated AA to B in Comparative Example 2.

TABLE 3

|  | Liquid Crystal Composition | Polymerizable Compound | Solubility |
| --- | --- | --- | --- |
| Example 2-1 | Liquid Crystal Composition No. 1 | Polymerizable Compound No. 1 | AA |
| Example 2-2 | Liquid Crystal Composition No. 1 | Polymerizable Compound No. 2 | AA |
| Example 2-3 | Liquid Crystal Composition No. 1 | Polymerizable Compound No. 3 | AA |
| Example 2-4 | Liquid Crystal Composition No. 1 | Polymerizable Compound No. 4 | AA |
| Example 2-5 | Liquid Crystal Composition No. 1 | Polymerizable Compound No. 5 | AA |
| Example 2-6 | Liquid Crystal Composition No. 1 | Polymerizable Compound No. 6 | AA |
| Example 2-7 | Liquid Crystal Composition No. 1 | Polymerizable Compound No. 7 | AA |
| Example 2-8 | Liquid Crystal Composition No. 1 | Polymerizable Compound No. 11 | AA |
| Example 2-9 | Liquid Crystal Composition No. 1 | Polymerizable Compound No. 41 | A |
| Example 2-10 | Liquid Crystal Composition No. 1 | Polymerizable Compound No. 42 | A |
| Example 2-11 | Liquid Crystal Composition No. 1 | Polymerizable Compound No. 43 | A |
| Example 2-12 | Liquid Crystal Composition No. 1 | Polymerizable Compound No. 44 | A |
| Comp. Ex. 2-1 | Liquid Crystal Composition No. 1 | Comp. Polymerizable Compound No. 1 | AA |
| Comp. Ex. 2-2 | Liquid Crystal Composition No. 1 | Comp. Polymerizable Compound No. 2 | AA |
| Comp. Ex. 2-3 | Liquid Crystal Composition No. 1 | Comp. Polymerizable Compound No. 3 | A |
| Comp. Ex. 2-4 | Liquid Crystal Composition No. 1 | Comp. Polymerizable Compound No. 4 | C |
| Comp. Ex. 2-5 | Liquid Crystal Composition No. 1 | Comp. Polymerizable Compound No. 5 | C |
| Comp. Ex. 2-6 | Liquid Crystal Composition No. 1 | Comp. Polymerizable Compound No. 6 | B |
| Comp. Ex. 2-7 | Liquid Crystal Composition No. 1 | Comp. Polymerizable Compound No. 7 | B |
| Comp. Ex. 2-8 | Liquid Crystal Composition No. 1 | Comp. Polymerizable Compound No. 8 | B |

As is apparent from the results in Table 3, all the polymerizable liquid crystal compositions containing the specific polymerizable compounds of the invention are superior in solubility, whereas some of the polymerizable liquid crystal

TABLE 4

|  | Liquid Crystal Composition | Polymerizable Compound | Alignment Properties |
| --- | --- | --- | --- |
| Example 2-1 | Liquid Crystal Composition No. 1 | Polymerizable Compound No. 1 | good |
| Example 2-2 | Liquid Crystal Composition No. 1 | Polymerizable Compound No. 2 | good |
| Example 2-3 | Liquid Crystal Composition No. 1 | Polymerizable Compound No. 3 | good |
| Example 2-8 | Liquid Crystal Composition No. 1 | Polymerizable Compound No. 11 | good |
| Example 2-9 | Liquid Crystal Composition No. 1 | Polymerizable Compound No. 41 | good |
| Example 2-10 | Liquid Crystal Composition No. 1 | Polymerizable Compound No. 42 | good |
| Example 2-11 | Liquid Crystal Composition No. 1 | Polymerizable Compound No. 43 | good |
| Example 2-12 | Liquid Crystal Composition No. 1 | Polymerizable Compound No. 44 | good |
| Comp. Ex. 1-1 | Liquid Crystal Composition No. 1 | none | good |
| Comp. Ex. 2-1 | Liquid Crystal Composition No. 1 | Comp. Polymerizable Compound No. 1 | no good |
| Comp. Ex. 2-2 | Liquid Crystal Composition No. 1 | Comp. Polymerizable Compound No. 2 | no good |
| Comp. Ex. 2-3 | Liquid Crystal Composition No. 1 | Comp. Polymerizable Compound No. 3 | no good |
| Comp. Ex. 2-6 | Liquid Crystal Composition No. 1 | Comp. Polymerizable Compound No. 6 | no good |

As is apparent from the results in Table 4 above, addition of the comparative polymerizable compound results in alignment disturbance compared with no use of any polymerizable compound. In contrast, addition of the polymerizable compound of the invention causes no disturbance of alignment.

Examples 3-1 to 3-3

One part of polymerizable compound No. 1 was mixed with 99 parts of each of liquid crystal composition Nos. 2 to 4, and a photopolymerization initiator, Irgacure 651 from Ciba Specialty Chemicals, was added to the mixture in an amount of 2% based on the polymerizable compound to give a polymerizable compound-containing liquid crystal composition.

Evaluation Example 2

Comparison of VHR

The polymerizable compound-containing liquid crystal compositions of Examples 2-1 to 2-3, 2-8 to 2-12, and 3-1 to 3-3 were subjected to VHR measurement in the same manner as in Example 1-1. The results obtained are shown in Table 5.

TABLE 5

|  | Liquid Crystal Composition | Polymerizable Compound | VHR (%) |
| --- | --- | --- | --- |
| Example 2-1 | Liquid Crystal Composition No. 1 | Polymerizable Compound No. 1 | 99.3 |
| Example 2-2 | Liquid Crystal Composition No. 1 | Polymerizable Compound No. 2 | 99.0 |
| Example 2-3 | Liquid Crystal Composition No. 1 | Polymerizable Compound No. 3 | 99.1 |
| Example 2-8 | Liquid Crystal Composition No. 1 | Polymerizable Compound No. 11 | 99.0 |
| Example 2-9 | Liquid Crystal Composition No. 1 | Polymerizable Compound No. 41 | 99.3 |
| Example 2-10 | Liquid Crystal Composition No. 1 | Polymerizable Compound No. 42 | 99.2 |
| Example 2-11 | Liquid Crystal Composition No. 1 | Polymerizable Compound No. 43 | 99.2 |
| Example 2-12 | Liquid Crystal Composition No. 1 | Polymerizable Compound No. 44 | 99.0 |
| Example 3-1 | Liquid Crystal Composition No. 2 | Polymerizable Compound No. 1 | 92.9 |
| Example 3-2 | Liquid Crystal Composition No. 3 | Polymerizable Compound No. 1 | 93.7 |
| Example 3-3 | Liquid Crystal Composition No. 4 | Polymerizable Compound No. 1 | 97.9 |

It is seen from Table 5 that, of the liquid crystal compositions of the invention, those based on the nematic liquid crystal composition containing 30 to 100% of the liquid crystal compound of formula (II) and 5 to 50% of the liquid crystal compound of formula (IV) (i.e., Examples 2-1, 2-2, 2-3, 2-8, 2-9, 2-10, 2-11, and 2-12) have very high reliability based on the particularly low reduction in VHR.

Evaluation Example 3

Comparison of Response Time

The response time of the polymerizable compound-containing liquid crystal compositions of Examples 2-1, 2-2, and 2-3 was measured in the same manner as in Example 1-1. The results obtained are shown in Table 6. Table 6 also contains the result of the polymerizable compound-free liquid crystal composition No. 1 measured in Comparative Example 1-1.

TABLE 6

|  | Liquid Crystal Composition | Polymerizable Compound | Response Time (ms) |
| --- | --- | --- | --- |
| Example 2-1 | Liquid Crystal Composition No. 1 | Polymerizable Compound No. 1 | 41 |
| Example 2-2 | Liquid Crystal Composition No. 1 | Polymerizable Compound No. 2 | 35 |
| Example 2-3 | Liquid Crystal Composition No. 1 | Polymerizable Compound No. 3 | 39 |
| Comp. Ex. 1-1 | Liquid Crystal Composition No. 1 | none | 53 |

The results in Table 6 prove that use of the polymerizable compounds of the invention provides liquid crystal compositions showing a rapider response.

Evaluation Example 4

Comparison of Polymerization Reactivity

The polymerizable compound-containing liquid crystal compositions of Example 2-1 and 2-2 were evaluated for polymerization reactivity. A test cell for liquid crystal evaluation (cell gap: 5 µm; electrode area: 8 mm×8 mm; alignment film: JALS 2096) was filled with the liquid crystal composition, sealed the inlet with a sealant, and irradiated with light of 1000 mJ/cm$^2$ using a high pressure mercury lamp to induce photopolymerization. Then, the cell was disassembled, and the polymerized liquid crystal composition in the cell was extracted with acetonitrile. The extract was analyzed by HPLC. Separately, the same liquid crystal compositions before polymerization were analyzed by HPLC. The peak intensity of the residual monomer in HPLC after polymerization and that before polymerization were compared to calculate a monomer retention (%). The results obtained are shown in Table 7 below.

TABLE 7

|  | Liquid Crystal Composition | Polymerizable Compound | Monomer Retention (%) |
| --- | --- | --- | --- |
| Example 2-1 | Liquid Crystal Composition No. 1 | Polymerizable Compound No. 1 | 1 |
| Example 2-2 | Liquid Crystal Composition No. 1 | Polymerizable Compound No. 2 | 7 |

It is seen from the results in Table 7 that, of the polymerizable compounds of formula (I), polymerizable compound No. 1, in which $M^1$ and $M^2$ are both methyl, has high polymerizability as proved by the small monomer retention.

Evaluation Example 5

Influences of Temperature on VHR

The influences of temperature on VHR of the polymerizable compound-containing liquid crystal compositions obtained in Examples 2-1, 2-2, and 2-3 were examined as follows to evaluate reliability of the compositions. The VHR was measured in the same manner as in Example 1-1, except that the measuring temperature was changed to 60° C., and the results were compared with those of Evaluation Example 2, which were obtained at a measuring temperature of 25° C. The results obtained are shown in Table 8

TABLE 8

| | Liquid Crystal Composition | Polymerizable Compound | VHR (%) 25° C. | VHR (%) 60° C. |
|---|---|---|---|---|
| Example 2-1 | Liquid Crystal Composition No. 1 | Polymerizable Compound No. 1 | 99.3 | 98.3 |
| Example 2-2 | Liquid Crystal Composition No. 1 | Polymerizable Compound No. 2 | 99.0 | 95.6 |
| Example 2-3 | Liquid Crystal Composition No. 1 | Polymerizable Compound No. 3 | 99.1 | 96.7 |

As can be seen from the results in Table 8, polymerizable compound No. 1, in which $M^1$ and $M^2$ are both methyl, is not so different from other polymerizable compounds in VHR at a measuring temperature of 25° C. but shows a smaller reduction in VHR at a measuring temperature of 60° C. from VHR at 25° C. than the other polymerizable compounds. This clearly proves that, of the liquid crystal compositions of the invention, those containing the polymerizable compound in which $M^1$ and $M^2$ are both methyl are more suited for use in active matrix displays demanding high reliability.

It is apparent from the foregoing Examples, Comparative Examples, and Evaluation Examples that the liquid crystal compositions of the invention have good solubility and, upon being irradiated with an energy ray, such as an ultraviolet ray, provide an LCD capable of high-speed response without undergoing reduction in reliability (voltage holding ratio).

Industrial Applicability

The liquid crystal composition of the invention is useful in that it does not undergo reduction in VHR when irradiated with an energy ray, such as an ultraviolet ray, and provides an LCD capable of high-speed response.

The invention claimed is:

1. A liquid crystal composition, comprising:
   100 parts by mass of a nematic liquid crystal composition having negative dielectric anisotropy ($\Delta\epsilon$), and
   0.01 to 3 parts by mass of a polymerizable compound represented by general formula (I):

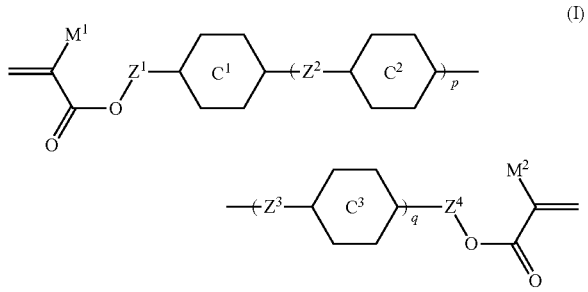

wherein, ring $C^1$, ring $C^2$, and ring $C^3$ each independently represent a benzene ring, a cyclohexane ring, or a naphthalene ring, one or more hydrogen atoms of each of which are optionally substituted with an alkyl group having 1 to 3 carbon atoms, an alkoxy group having 1 to 3 carbon atoms, an acyl group having 1 to 3 carbon atoms, or a halogen atom;

$M^1$ an $M^2$ each independently represent a hydrogen atom or a methyl group;

$Z^1$ represents a direct bond, -$L^1$-, -$L^1$O—, -$L^1$O—CO—, or -$L^1$CO—O—, and $Z^4$ represents a direct bond, -$L^2$-, —O$L^2$-, —O—CO$L^2$-, or —CO—O$L^2$-, provided that at least one of $Z^1$ and $Z^4$ is not a direct bond;

$L^1$ and $L^2$ each independently represent an optionally branched alkylene group having 1 to 10 carbon atoms, the alkylene group being optionally interrupted by one to three oxygen atoms, provided that the two or three interrupting oxygen atoms are not continuous and that the interrupting oxygen atom is not continuous to an oxygen atom adjacent to the alkylene group; when $Z^1$ and $Z^4$ are the same, one or more hydrogen atoms of the rings $C^1$, $C^2$, and $C^3$ are substituted by an alkyl group having 1 to 3 carbon atoms, an alkoxy group having 1 to 3 carbon atoms, an acyl group having 1 to 3 carbon atoms, or a halogen atom;

$Z^2$ and $Z^3$ each independently represent a direct bond, an ester bond, an ether bond, or an optionally branched, saturated or unsaturated alkylene group having 2 to 8 carbon atoms, or a combination thereof;

$Z^1$ and $Z^4$ are different, or $L^1$ and $L^2$ are different; and p and q each independently represent 0 or 1, provided that $p+q \geq 1$.

2. The liquid crystal composition according to claim 1, wherein either $Z^1$ or $Z^4$ is a direct bond.

3. The liquid crystal composition according to claim 1, wherein p and q are both 1.

4. The liquid crystal composition according to claim 1, wherein one or more hydrogen atoms of the rings $C^1$, $C^2$, and $C^3$ are substituted by an alkyl group having 1 to 3 carbon atoms, an alkoxy group having 1 to 3 carbon atoms, an acyl group having 1 to 3 carbon atoms, or a halogen atom.

5. The liquid crystal composition according to claim 1, wherein $Z^2$ and $Z^3$ are each an ester bond.

6. The liquid crystal composition according to claim 1, wherein at least one of $L^1$ and $L^2$ is an alkylene group having 2 to 8 carbon atoms.

7. The liquid crystal composition according to claim 1, wherein at least one of $M^1$ and $M^2$ is a methyl group.

8. The liquid crystal composition according to claim 1, wherein $M^1$ and $M^2$ are both a methyl group.

9. The liquid crystal composition according to claim 1, having the polymerizable compound represented by general formula (I) in an amount of 0.05 to 2 parts by mass per 100 parts by mass of the nematic liquid crystal composition having negative dielectric anisotropy ($\Delta\epsilon$).

10. The liquid crystal composition according to claim 1, wherein the nematic liquid crystal composition having negative dielectric anisotropy ($\Delta\epsilon$) comprises 30% to 100% by mass of a liquid crystal compound represented by general formula (II):

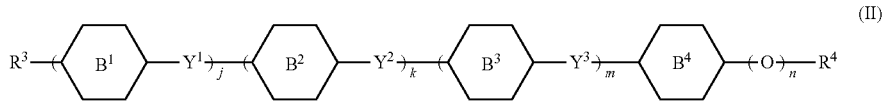

(II)

wherein,
- ring $B^1$, ring $B^2$, ring $B^3$, and ring $B^4$ each independently represent a benzene ring, a cyclohexane ring, a cyclohexene ring, a naphthalene ring, a decahydronaphthalene ring, a tetrahydronaphthalene ring, or an indane ring, one or more hydrogen atoms of which rings are optionally substituted by an alkyl group having 1 to 3 carbon atoms, an alkoxy group having 1 to 3 carbon atoms, a chlorine atom, or a fluorine atom, a —CH═ moiety of which rings is optionally substituted by —N═, and a —CH²— moiety of which rings is optionally substituted by —S—, —N═, or —O—; two or more hydrogen atoms of at least one of ring $B^3$ and ring $B^4$ are substituted by substitutes which may be the same or different and are selected from chlorine, fluorine, —CF₃—, —OCF₃, and —OCF₂H;
- $Y^1$, $Y^2$, and $Y^3$ each independently represent a direct bond, —CH₂—CH₂—, —CF₂—CF₂—, —CH═CH—, —CF═CF—, —CH₂—O—, —O—CH₂—, —CF₂—O—, —O—CF₂—, —CH₂—S—, —S—CH₂—, —CF₂—S—, —S—CF₂—, —O—CF₂—C₂H₄—, —C₂H₄—CF₂—O—, —CO—O—, —O—CO—, —CH₂—CH₂—CO—O—, —O—CO—CH₂—CH₂—, or —C≡C—;
- $R^3$ and $R^4$ each independently represent an alkyl group having 1 to 6 carbon atoms or an alkenyl group having 2 to 6 carbon atoms;
- j, k, and m each independently represent 0 or 1, provided that $j+k+m \geq 1$; and
- n represents 0 or 1.

11. The liquid crystal composition according to claim 10, wherein the liquid crystal compound represented by general formula (II) is represented by general formula (III):

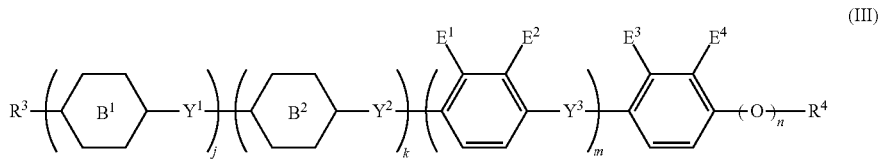

(III)

wherein,
- ring $B^1$, ring $B^2$, $Y^1$, $Y^2$, $Y^3$, $R^3$, $R^4$, j, k, m, and n are as defined for general formula (II); and
- $E^1$, $E^2$, $E^3$, and $E^4$ each represent hydrogen, chlorine, fluorine, —CF₃, —OCF₃, or —OCF₂H, provided that at least one of the $E^1/E^2$ combination and the $E^3/E^4$ combination consists of other than hydrogen.

12. The liquid crystal composition according to claim 11, wherein $E^1$, $E^2$, $E^3$, and $E^4$ are each hydrogen or fluorine.

13. The liquid crystal composition according to claim 11, wherein $E^3$ and $E^4$ are each fluorine, $Y^2$ is a direct bond, k is 1, and m is 0.

14. The liquid crystal composition according to claim 10, wherein the nematic liquid crystal composition having nega-tive dielectric anisotropy (Δ∈) further comprises 5% to 50% by mass of a liquid crystal compound represented by general formula (IV):

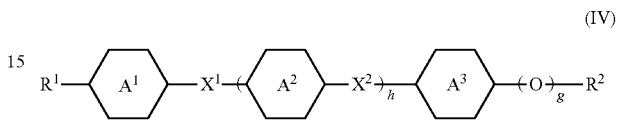

(IV)

wherein,
- ring $A^1$, ring $A^2$, and ring $A^3$ each independently represent a benzene ring, a cyclohexane ring, a cyclohexene ring, a naphthalene ring, a decahydronaphthalene ring, or a tetrahydronaphthalene ring, one or more hydrogen atoms of which rings are optionally substituted by an alkyl group having 1 to 3 carbon atoms or an alkoxy group having 1 to 3 carbon atoms, a —CH═ moiety of which rings is optionally substituted by —N═, and a —CH²— moiety of which rings is optionally substituted by —S—, —N═, or —O—;
- $X^1$, and $X^2$ each independently represent a direct bond, —CH₂—CH₂—, —CF₂—CF₂—, —CH═CH—, —CF═CF—, —CH₂—O—, —O—CH₂—, —CF₂—O—, —O—CF₂—, or —C≡C—;
- $R^1$ and $R^2$ each independently represent an alkyl group having 1 to 6 carbon atoms or an alkenyl group having 2 to 6 carbon atoms; and
- g and h each independently represent 0 or 1.

15. An electrooptical display device, fabricated by sandwiching the liquid crystal composition according to claim 1 between two substrates, at least one of which has an electrode to apply a voltage to liquid crystal molecules, and irradiating the liquid crystal composition with an energy ray to cause the polymerizable compound represented by general formula (I) present in the liquid crystal composition to polymerize.

16. The liquid crystal composition according to claim 2, wherein p and q are both 1.

17. The liquid crystal composition according to claim 2, wherein one or more hydrogen atoms of the rings $C^1$, $C^2$, and $C^3$ are substituted by an alkyl group having 1 to 3 carbon atoms, an alkoxy group having 1 to 3 carbon atoms, an acyl group having 1 to 3 carbon atoms, or a halogen atom.

* * * * *